(12) United States Patent
Hefley

(10) Patent No.: US 11,422,830 B1
(45) Date of Patent: Aug. 23, 2022

(54) DECENTRALIZED MOBILE DEVICE CONTROL

(71) Applicant: C/HCA, Inc., Nashville, TN (US)

(72) Inventor: Daniel Hefley, Plano, TX (US)

(73) Assignee: C/HCA, Inc., Nashville, TN (US)

( * ) Notice: Subject to any disclaimer, the term of this patent is extended or adjusted under 35 U.S.C. 154(b) by 0 days.

(21) Appl. No.: 17/194,138

(22) Filed: Mar. 5, 2021

Related U.S. Application Data

(60) Provisional application No. 62/985,497, filed on Mar. 5, 2020.

(51) Int. Cl.
  *G06F 9/44* (2018.01)
  *G06F 9/445* (2018.01)
  *G06F 8/61* (2018.01)

(52) U.S. Cl.
  CPC .......... *G06F 9/44505* (2013.01); *G06F 8/62* (2013.01)

(58) Field of Classification Search
  CPC ................ G06F 1/32; G06F 9/44; G06F 1/12
  See application file for complete search history.

(56) References Cited

U.S. PATENT DOCUMENTS

| | | | | |
|---|---|---|---|---|
| 2005/0245249 | A1* | 11/2005 | Wierman | H04M 3/42178 455/419 |
| 2014/0365264 | A1* | 12/2014 | Smiley | G05B 23/0221 705/7.25 |
| 2015/0047046 | A1* | 2/2015 | Pavlyushchik | H04L 63/1433 726/25 |
| 2020/0403855 | A1* | 12/2020 | Sarood | H04L 41/0863 |

* cited by examiner

*Primary Examiner* — Keshab R Pandey
(74) *Attorney, Agent, or Firm* — Kilpatrick Townsend & Stockton, LLP

(57) ABSTRACT

Systems, methods, and processor-readable media for decentralized mobile device control are provided. Operational metrics of a mobile device may be detected. Operational specifications with operating parameters specified for the mobile device may be accessed. It may be determined that the operational metrics correspond to an operational degradation condition of the mobile device based on comparing the operating parameters to the operational metrics. A device identifier corresponding to the mobile device may be determined. Device specifications that are identified as a function of the device identifier may be accessed. The device specifications identified as a function of the device identifier may be used to identify applications and/or configuration data that are specified for the mobile device and mapping the applications and/or the configuration data to the operational degradation condition of the mobile device. The mobile device may be configured with the applications and/or the configuration data.

20 Claims, 16 Drawing Sheets

DECENTRALIZED MOBILE DEVICE CONTROL

CROSS-REFERENCE TO RELATED APPLICATION

This application claims the benefit of and priority to U.S. Provisional Application No. 62/985,497, filed Mar. 5, 2020, which is hereby incorporated by reference in its entirety for all purposes.

FIELD

Disclosed embodiments according to the present disclosure relate generally to mobile computing devices, and in particular to systems, methods, and processor-readable media for decentralized mobile device control.

BACKGROUND

This specification relates in general to controlling a mobile device. An entity may provide mobile devices to users for a variety of purposes. Maintaining a fleet of mobile devices may require configuring, reconfiguring, and/or reassigning the mobile devices, which is a time-consuming process, especially when large numbers of mobile devices are involved. Thus, there is a need to solve these problems and provide for systems, methods, and processor-readable media for decentralized mobile device control. These and other needs are addressed by the present disclosure.

BRIEF SUMMARY

Certain embodiments according to the present disclosure relate generally to mobile computing devices, and in particular to systems, methods, and processor-readable media for decentralized mobile device control.

In one aspect, a system to facilitate adaptive operational control of a mobile device is disclosed. The system may include one or more processing devices and memory communicatively coupled with and readable by the one or more processing devices and having stored therein processor-readable instructions which, when executed by the one or more processing devices, cause the one or more processing devices to perform operations. The operations may include one or a combination of the following. One or more operational metrics of a mobile device may be detected. Operational specifications with operating parameters specified for the mobile device may be accessed. The operating parameters may be compared to the one or more operational metrics. It may be determined that the one or more operational metrics correspond to an operational degradation condition of the mobile device based at least in part on the comparing the operating parameters to the one or more operational metrics. A device identifier corresponding to the mobile device may be determined. Consequent to the determining that the one or more operational metrics correspond to an operational degradation condition of the mobile device one or a combination of the following may be performed. Device specifications that are identified as a function of the device identifier may be accessed. The device specifications identified as a function of the device identifier may be used to identify one or more applications and/or configuration data that are specified for the mobile device and mapping the one or more applications and/or the configuration data to the operational degradation condition of the mobile device. Transmission of the one or more applications and/or the configuration data to the mobile device may be caused, where, consequent to the transmission, the mobile device may be configured with the one or more applications and/or the configuration data.

In another aspect, one or more non-transitory, machine-readable media having machine-readable instructions thereon are disclosed, which instructions, when executed by one or more processing devices, may cause the one or more processing devices to perform one or a combination of the following operations. The operations may include one or a combination of the following. One or more operational metrics of a mobile device may be detected. Operational specifications with operating parameters specified for the mobile device may be accessed. The operating parameters may be compared to the one or more operational metrics. It may be determined that the one or more operational metrics correspond to an operational degradation condition of the mobile device based at least in part on the comparing the operating parameters to the one or more operational metrics. A device identifier corresponding to the mobile device may be determined. Consequent to the determining that the one or more operational metrics correspond to an operational degradation condition of the mobile device one or a combination of the following may be performed. Device specifications that are identified as a function of the device identifier may be accessed. The device specifications identified as a function of the device identifier may be used to identify one or more applications and/or configuration data that are specified for the mobile device and mapping the one or more applications and/or the configuration data to the operational degradation condition of the mobile device. Transmission of the one or more applications and/or the configuration data to the mobile device may be caused, where, consequent to the transmission, the mobile device may be configured with the one or more applications and/or the configuration data.

In yet another aspect, a method to facilitate adaptive operational control of a mobile device is disclosed. The method may include one or a combination of the following. One or more operational metrics of a mobile device may be detected. Operational specifications with operating parameters specified for the mobile device may be accessed. The operating parameters may be compared to the one or more operational metrics. It may be determined that the one or more operational metrics correspond to an operational degradation condition of the mobile device based at least in part on the comparing the operating parameters to the one or more operational metrics. A device identifier corresponding to the mobile device may be determined. Consequent to the determining that the one or more operational metrics correspond to an operational degradation condition of the mobile device one or a combination of the following may be performed. Device specifications that are identified as a function of the device identifier may be accessed. The device specifications identified as a function of the device identifier may be used to identify one or more applications and/or configuration data that are specified for the mobile device and mapping the one or more applications and/or the configuration data to the operational degradation condition of the mobile device. Transmission of the one or more applications and/or the configuration data to the mobile device may be caused, where, consequent to the transmission, the mobile device may be configured with the one or more applications and/or the configuration data.

In various embodiments of the systems, method, and machine-readable media, configuring of the mobile device with the identified one or more applications and/or the configuration data may be caused. In various embodiments, the determining the device identifier corresponding to the mobile device may be based at least in part on a matrix code generated by the mobile device. In various embodiments, at least one of the one or more operational metrics, the operational degradation condition, and/or the operating parameters may be determined based at least in part on a matrix code. In various embodiments, the operations and method may include downloading the one or more applications and/or the configuration data from a remote system or instantiating the one or more applications and/or the configuration data from previously stored instance of the one or more applications and/or the configuration data on a second mobile device. In various embodiments, the operations and method may be performed by the second mobile device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
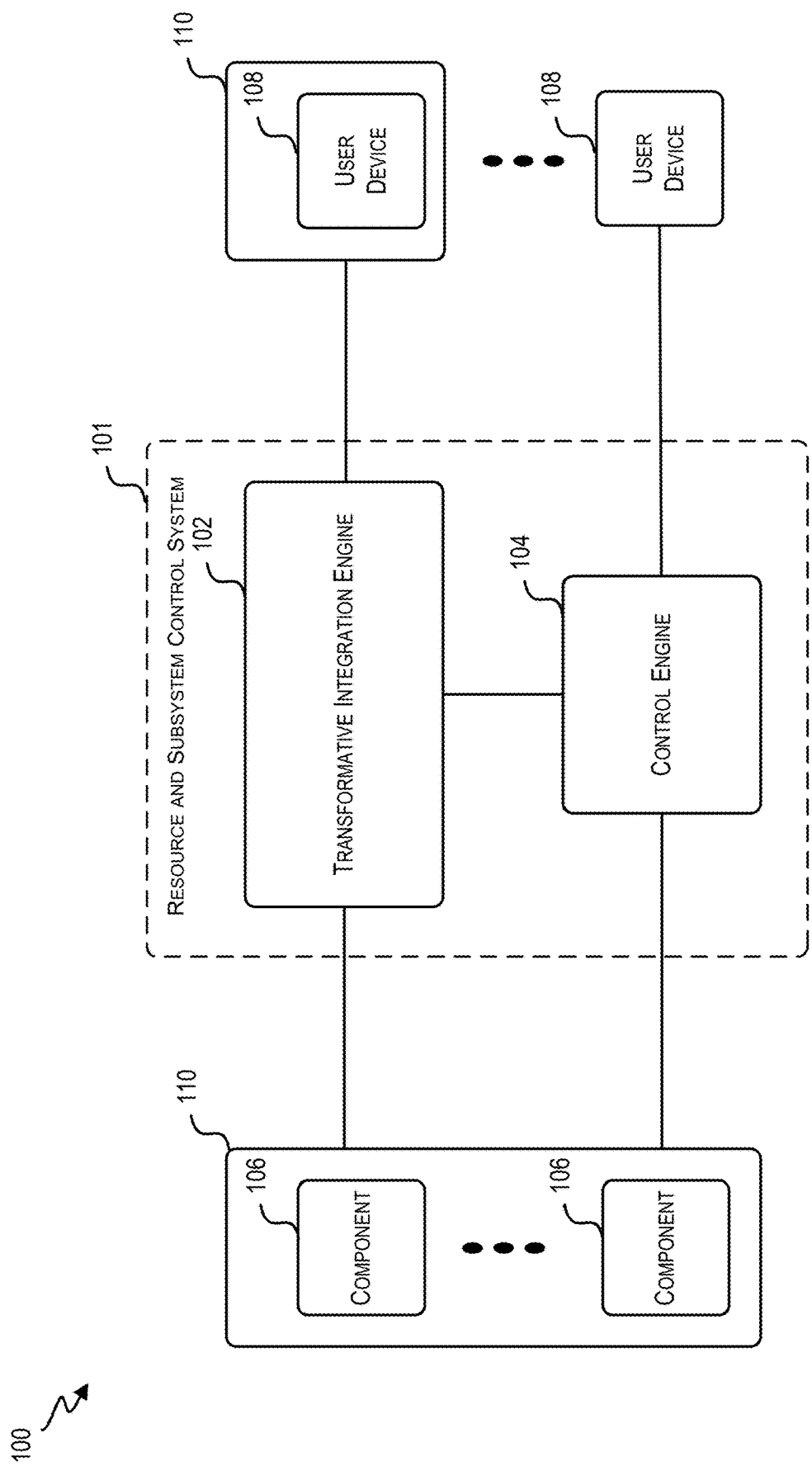
FIG. 1 illustrates a block diagram of aspects of an interaction system with a control system, in accordance with embodiments according to the present disclosure.

FIG. 1 depicts a block diagram of an embodiment of an interaction system 100 with an resource and subsystem control system 101 (also referenced herein as the adaptive system 101) is illustrated. In various embodiments, the adaptive system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Adaptation (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, webserver premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Disclosed embodiments may provide for decentralized mobile device control of mobile devices 108 such as smartphones, cell phones, tablets, smart watches, and other mobile devices disclosed herein. Oftentimes, mobile devices generally begin to have degraded operational conditions—experience errors, have obsolete configurations, experience network connectivity disruptions and disabilities, experience performance and communication problems, and/or a variety of other instances where the mobile devices may be controlled, repaired, updated, and/or otherwise reconfigured (mobile device control operations) in order to communicate and/or otherwise function in an improved manner. Compounding such needs is the common instance of mobile devices, generally speaking, being located in the field away from a central system. Connecting to a central system by a mobile device may be of course problematic when network connectivity problems are experienced by the device. Additionally or alternatively, problems may be experienced in logging onto a central system, identifying the needed control operations, repairs, updates, and/or other reconfigurations, obtaining necessary authentications and permissions, and/or the like. Conventional solutions fail to account for such problems in an efficient and effective manner. Moreover, conventional solutions fail to eliminate the necessity of troubleshooting degraded operational conditions, which consumes significant time and other resources while taking too long to eliminate the degraded operational condition such that the mobile device is not back online in an efficient and rapid manner. Accordingly, disclosed embodiments may provide for mobile device control that is decentralized in order to provide for various mobile device healing operations (mobile device control operations) in accordance with various embodiments disclosed herein that solve such problems and eliminate the deficiencies of conventional solutions while accelerating the upgrading of mobile devices to improve their performance.

The decentralized mobile device control may allow for control, repair, update, and/or reconfiguration of mobile devices 108 in a decentralized manner that does not require the mobile devices 108 to be logged in or otherwise communicating with the system 101 or another central system. For example, the decentralized mobile device control may allow for control, repair, update, and/or reconfiguration (mobile device control operations) of a first mobile device 108 by way of a second mobile device 108, instead of a central host system. Accordingly, a non-degraded mobile device 108 may facilitate upgrading/restoring a degraded mobile device 108, facilitating the control, repair, update, and/or reconfiguration of the degraded mobile device 108. In various embodiments, the various mobile device healing operations may be performed with wholly or partially peer-to-peer processes. The mobile device control may be facilitated by a network of two or more mobile devices that are configured to facilitate the mobile device control. In some embodiments, the mobile devices may have one or more applications (e.g., a mobile device control application) installed thereon to facilitate the mobile device control operations disclosed herein.

In some embodiments, the mobile devices 108 may be preconfigured to facilitate the mobile device control operations prior to one or more of the mobile devices experiencing a need for control, repair, update, and/or reconfiguration. In some embodiments, this may include the mobile devices 108 having one or more applications installed there thereon to facilitate the mobile device control operations prior to one or more of the mobile devices experiencing an operational degradation condition. In an example of such instances, the mobile device 108 configured with the mobile device control application may self-detect an operational degradation condition according to operational specifications with operating parameters and thresholds which the device may use in order to determine its operational status and detect when operational degradation conditions arise/exist. The operational degradation conditions may include one or combination of state changes transitioning to limited or no network connectivity, application errors, obsolete configurations (e.g., of applications, software updates, and or the like), processing, output, communication, and/or other performance metrics not satisfying the thresholds, and/or the like. When such an operational condition is detected, the healing operation processes may be initiated to ultimately execute a solution which may include allow allowing the mobile device to obtain an updated configuration profile which the mobile device may use to resolve the operational degradation condition.

In various embodiments, one or more applications may be installed on a first mobile device 108 as part of the healing operations disclosed herein. This may correspond to a reactive/responsive solution. For example, when a first mobile device 108 begins to have an operational condition, if a mobile device control application is not already installed on the mobile device 108, one may be installed in order to facilitate addressing the operational condition. In some instances, when the mobile device 108 has connectivity to a remote data source such as the system 101 and the functions of the mobile device are sufficient to facilitate downloading of the mobile device control application, the mobile device control application may be downloaded from the system and installed on the mobile device 108. However, when the mobile device does not have such connectivity and functionality, the mobile device control application may be transferred from a second mobile device 108. For example, a second mobile device 108 may be configured with the mobile device control application and may, as a part of the healing operations disclosed herein, facilitate transferring of an instance of the mobile device control application to the first mobile device 108 (e.g., via a peer-to-peer connection). The wireless device-to-device communications may be made by way of, for example, Zigbee™, Bluetooth™, WiFi™, IR, UWB, WiFi-Direct, BLE, cellular, Long-Term Adaptation (LTE), WiMax™, and/or the like. Once device-to-device communications are established between the mobile devices 108, interface prompts may be initiated into order to acquire authorization to transfer, receive, and install the application on the first device 108.

In some embodiments, the application or an agent spun up by the application may be configured to perform background monitoring processes to monitor for degradation conditions. When a degradation conditions detected, the application or agent may be configured to more fully invoke, awaken, open, or otherwise activate the application to perform further operations to redress the detected degradation condition.

Responsive to first mobile device 108 configured with the application detecting the operational degradation condition, the first mobile device may dynamically create a matrix code such as one or a combination of a QR code, a 2-dimensional display or 3-dimensional (e.g., holographic) display defining patterns and regions of squares, other geometric shapes, and spaces that embody data, a bar code, and/or the like. The application may generate the matrix code and cause the matrix code to be displayed with a display of the first mobile device. The application may prompt the photographing, scanning, or otherwise capturing of the image of the matrix code by a camera or other sensor of the second mobile device 108. In some embodiments, such prompting may be performed at least in part by audio cues and commands of a virtual assistant of the first mobile device 108. Additionally or alternatively, some prompting may include wireless communications from the first mobile device to the second mobile device 108. A corresponding application installed on the second mobile device 108 may be invoked, awakened, opened, or otherwise activated responsive to the wireless communications. The prompts may include textual and/or other graphical interface elements presented with the first mobile device 108 and/or the second mobile device 108.

Advantageously, the operations of the first mobile device 108 configured with the application may generate the specifications defined by matrix code such that the one or more problems of the first mobile device 108 may be eliminated without the necessity and resource consumption of troubleshooting the first mobile device 108. In some embodiments, the matrix code may include specifications of configuration data allow for the identification of the first mobile device, the operational condition of the first mobile device 108, and/or the one or more errors, obsolete configurations, network connectivity disruptions or disabilities, performance or communication problems, and/or the like. For example, in some instances, the matrix code may include specifications of a custom profile configuration that allows for the connection of the first mobile 108 device to one or more servers and/or the second mobile device in order to allow for reset to a native state, upgrade to a target state, and/or the like. Additionally, the matrix code may include a unique device identifier for the first mobile device 108. In various embodiments, the device identifier, which may be encrypted and/or randomized, may correspond to a serial number, the machine identifier, a dynamic time-based generated code that changes over time, a hash of the machine identifier and a timestamp, and/or the like. The matrix code may include profile connection specifications to allow for different/alternative connections than the previously configured network connections of the first mobile device 108. For example, the matrix code may allow for peer-to-peer connection between the first mobile device and the second mobile device. Additionally or alternatively, the matrix code may include connection specifications to allow the second mobile device to join a network to facilitate healing operations, where the connection specifications may be based on settings specified in the mobile device control application that generated the matrix code on the first mobile device 108. The matrix code may include the data that allows for the determination of which control, repair, update, reconfiguration, and/or connection operations are needed in order to redress the degradation condition.

The mobile device control application installed on one or both of the first mobile device 108 and the second mobile device 108 may be configured with instructions to allow for one or both of the first mobile device and the second device to use or more APIs to connect to the adaptive control system 101 on the backend to pull data to facilitate redress of the degradation conditions. For example, when the first mobile device 108 has network connectivity to the backend adaptive system 101, the first mobile device may directly pull the data. However, when such connectivity is limited and/or disrupted, the second mobile device may pull the data from the backend adaptive system 101. Such data may include one or a combination of one or more applications, code segments, software patches, configuration data, and/or the like for processing, installation, and/or execution by the first mobile device 108. In various embodiments, the second mobile device may utilize the captured matrix code to create a file and convert the app sandbox into a local webserver and redirects to that file to allow the second mobile device 108 to operate as the local webserver in order to facilitate the healing operations.

In various embodiments, the second mobile device 108 configured with the mobile device control application may operate to transmit to the first mobile device 108 a set of one or more transmissions to redress the detected degradation condition. The set of transmissions may include one or a combination of one or more commands, applications, code segments, software patches, configuration data, and or the like for execution by the first mobile device 108. This may include pushing one or more applications to the first mobile device that may be a reinstallation, upgrades, and/or additional to the native set of applications on the first mobile device 108. Additionally or alternatively, this may include changing one or more configuration settings the first mobile device 108. In various embodiments, the operations may include a full or partial wipe of the first mobile device 108 initiated by the second mobile device 108 in order to redress the problems detected. The full or partial wiping of the device may clear state errors and the like in order to facilitate control, repair, upgrade, and/or reconfiguration of the first mobile device 108 by the second mobile device 108. In some embodiments, the full or partial wipe may correspond to a reset in part or in whole of the first mobile device to a native set of configurations. In various embodiments, the reset of the first mobile device 108 may be targeted rather than a full reset. The targeted reset may correspond to a reset of configuration data for one or more applications, a termination of one or more ongoing processes of the first mobile device 108, uninstalling and deleting one or more applications or other code segments of the first mobile device 108, transmitting refreshed/updated configuration data, transmitting one or more applications for installation to the first mobile device 108, transmitting one or more, patches, and/or other code segments for installation and execution on the first mobile device 108, and/or the like. Thus, in various embodiments, the healing operations may include causing the first mobile device 108 to reset to a native state, where the native state may correspond to a base configuration of one or more applications of the first mobile device 108 and/or the like. Additionally or alternatively, in various embodiments, the healing operations may include causing the first mobile device 108 to be configured for an upgraded state, where the upgraded state may correspond to an upgraded configuration of one or more applications of the first mobile device 108 and/or the like.

In one set of examples, a mobile device control application (that may be referenced herein as the MDM application) may be installed on both a target mobile device 108 (that may be referenced as in as the first mobile device) and an administrative mobile device 108 (that may be referenced as in as the second mobile device). A matrix code may be provided on a display of the target mobile device 108. The matrix code includes a device identifier identifying the target mobile device 108. The administrative mobile device may be used to scan the matrix code. Alternatively, the device identifier identifying the target mobile device 108 may be manually entered on a display of the administrative mobile device 108. The administrative mobile device then sends the device identifier of the target mobile device 108 to the adaptive system 101 (that may include and/or be referenced herein as an MDM system), which stores information about the target mobile device 108. The system 101 may send this information to the administrative mobile device 108, which may display items such as the name of the target mobile device 108, the applications that are installed on the target mobile device 108, the configurations that are installed on the target mobile device 108, etc. A list of uninstalled applications and configurations may also be displayed. The user may then use the administrative mobile device 108 to select various applications and/or configurations to be installed. Commands to download and/or install these applications and/or configurations are sent by the administrative mobile device 108 to the system 101, which pushes the commands to the target mobile device 108. This allows the target mobile device 108 to be updated remotely by the administrative mobile device 108.

After scanning the matrix code or receiving the device identifier of the target mobile device 108, the administrative mobile device 108 displays an interface for a user to enter WiFi network information, such as a service set identifier (SSID) and/or a pre-shared key (PSK). The administrative mobile device 108 then dynamically generates and displays a QR code for the WiFi network based on the device identifier of the target mobile device 108. Different QR codes may be generated for different WiFi networks. The QR code includes a custom configuration profile for the target mobile device 108. The QR code may be an Apple® configuration profile for the WiFi network for iOS devices.

The target mobile device 108 is then used to scan the QR code that is displayed on the administrative mobile device 108 (e.g., by taking a picture of the QR code) in order to join the WiFi network and obtain the custom configuration profile from the administrative mobile device 108. After scanning the QR code, the MDM application on the target mobile device operates as a local web server and provides the configuration profile to a web browser on the target mobile device 108, such as Safari, which begins the installation process for the configuration profile. Scanning the QR code allows the target mobile device 108 to circumvent restrictions on the WiFi networks that it is allowed to join. As a security measure, the MDM application on the target mobile device 108 may determine whether the QR code includes a payload identifier. If the QR code does not include the payload identifier, the configuration profile may not be installed. Scanning the QR code may be used to re-establish the target mobile device on a network after the target mobile device loses its connection to its home network. The QR code may include a duration of time, such as an hour, after which the target mobile device is disconnected from the WiFi network associated with the QR code and returns to its home network.

The MDM application may be installed on both the administrative mobile device 108 and the target mobile device 108 during initial setup of the devices. Further, in order to use the MDM application, each device 108 must be enrolled by the system 101. In addition, each target mobile device must have an API token to scan the QR code, as well as valid user identifier. The system 101 may push the user identifier to the target mobile device during enrollment.

A target mobile device 108 may be tagged to indicate that the target mobile device 108 is associated with a particular facility and/or department. After scanning the matrix code or receiving the device identifier of the target mobile device 108, the administrative mobile device 108 displays an interface that indicates whether the target mobile device 108 is currently tagged. The interface also provides a list of possible tags for the target mobile device 108. A user may assign or change the tag for the target mobile device 108 by clicking on one of the possible tags in the list. The administrative device 108 then sends the tag to the system 101, which pushes down a new configuration profile to the target mobile device 108 based on the tag. This procedure allows a user to remotely reassign or transfer the target mobile device 108 to another department.

Figure 2:
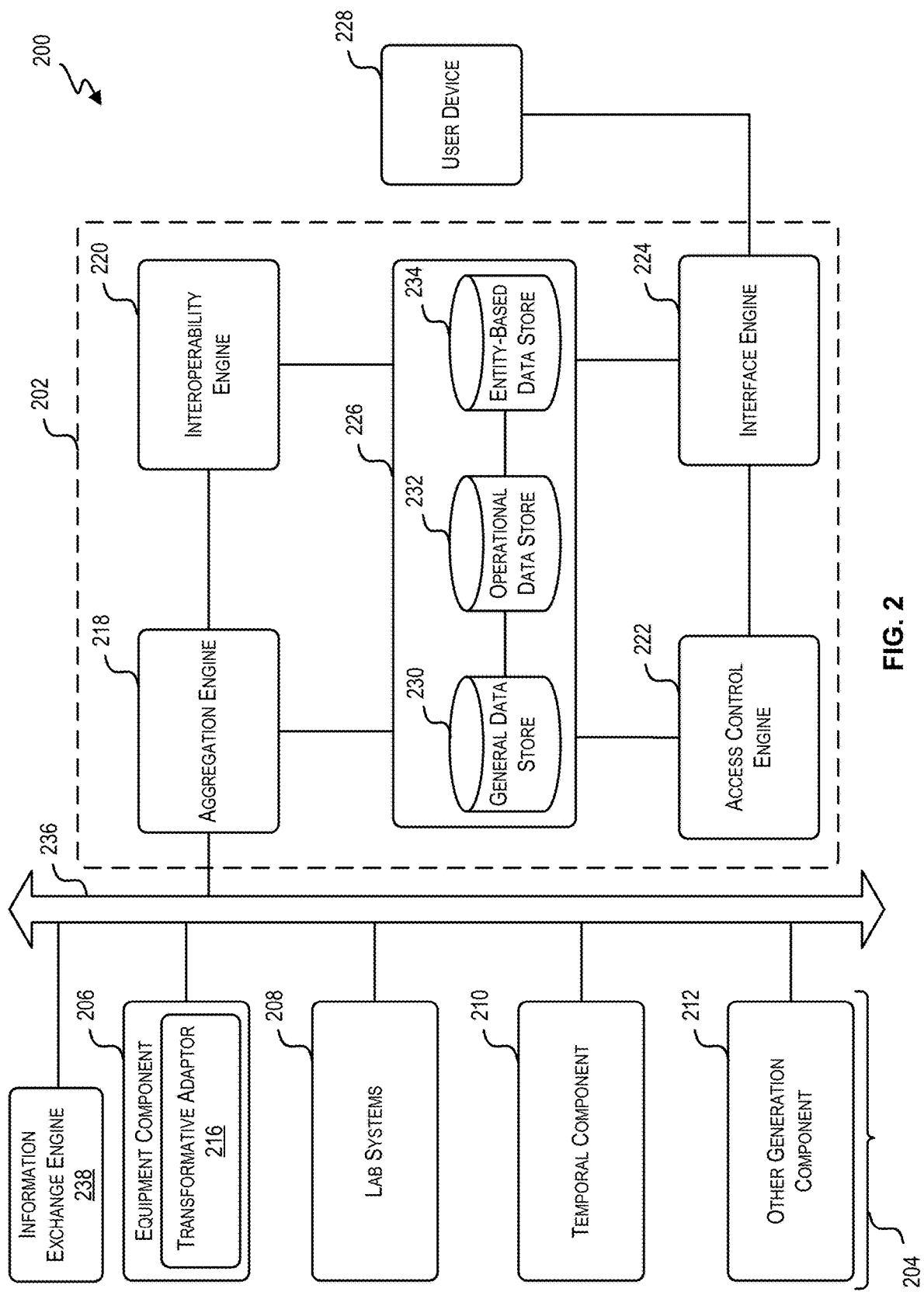
FIG. 2 illustrates a block diagram of aspects of the interaction system, in accordance with embodiments according to the present disclosure.

Referring next to FIG. 2, a block diagram of an example of an interaction system 200 is shown. Interaction system 200 may correspond to interaction system 100 illustrated in FIG. 1 and may include a transformative engine 202. Transformative engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation components 212. One or more generation components 204 are examples of one or more components 106 discussed herein.

Generally, one or more generation components 204 may include any suitable device or system capable of generating data in the context of an interaction system. For example, the other generation components 212 may include a sensor on a door, and equipment component 206 may include a sophisticated computer-controlled laser device. In either case, each generation component generates some type of data. For example, the data provided by the sensor may be used to address security concerns or testing heating, ventilating, and air conditioning (HVAC). The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative engine 202 in accordance with techniques described herein may achieve this design— making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-defined or learned. Transformative engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative engine 202.

Specification component 210 may include any suitable computing devices used for operations-related purposes with respect to interaction system 200. For example, specification component 210 may be configured to temporally specify a resource for allocation for a particular entity during a particular time slot. Specification component 210 may monitor a temporal specification for the resource and may identify one or more available time slots that may be secured by a particular entity. Upon receiving a specification indication, specification component 210 may update a temporal specification of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

In some embodiments, the transformative engine 202 may be configured to monitor data (e.g., messages) that is passed over the one or more networks 236 and, from the monitored data, select certain portions to provide to one or more authorized users via chat rooms/channels. For example, as disclosed herein, one or more agents may monitor data passed over the one or more networks 236. The one or more agents may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. Thus, in some embodiments, one or more bots may be configured as listeners, and agent engine 118C may, in some embodiments, correspond to the bot engine 118D, which are disclosed herein.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
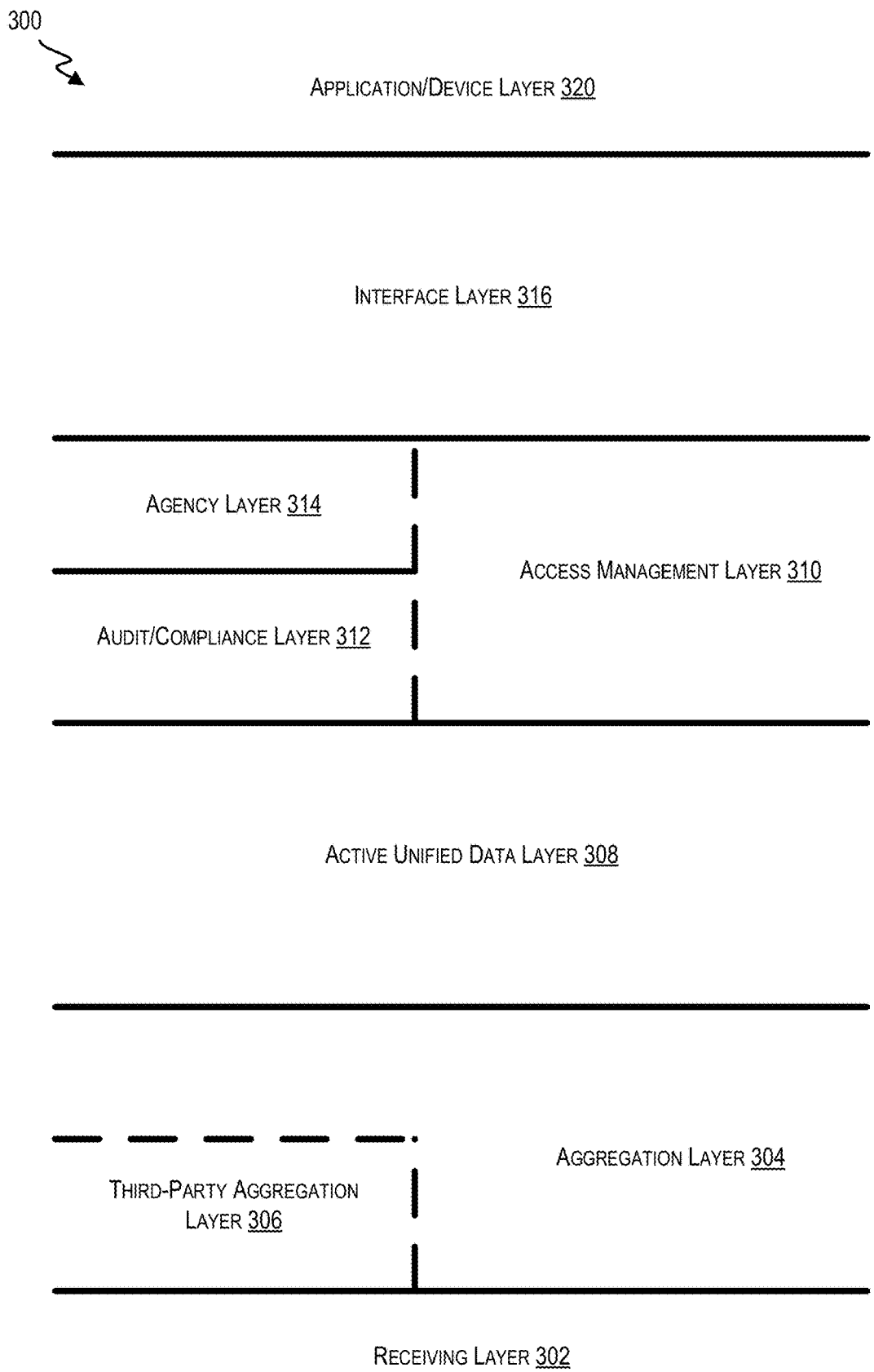
FIG. 3 illustrates a block diagram of an architecture stack of the control system, in accordance with embodiments according to the present disclosure.

Turning next to FIG. 3, an architecture stack 300 of the control system 101 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a temporal specification, or in any other suitable manner. In some examples, data of aggregation layer 304 may be aggregated according to input and/or rules and may aggregate across records pertaining to, e.g., a premises, entity, time period, characteristic (e.g., condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
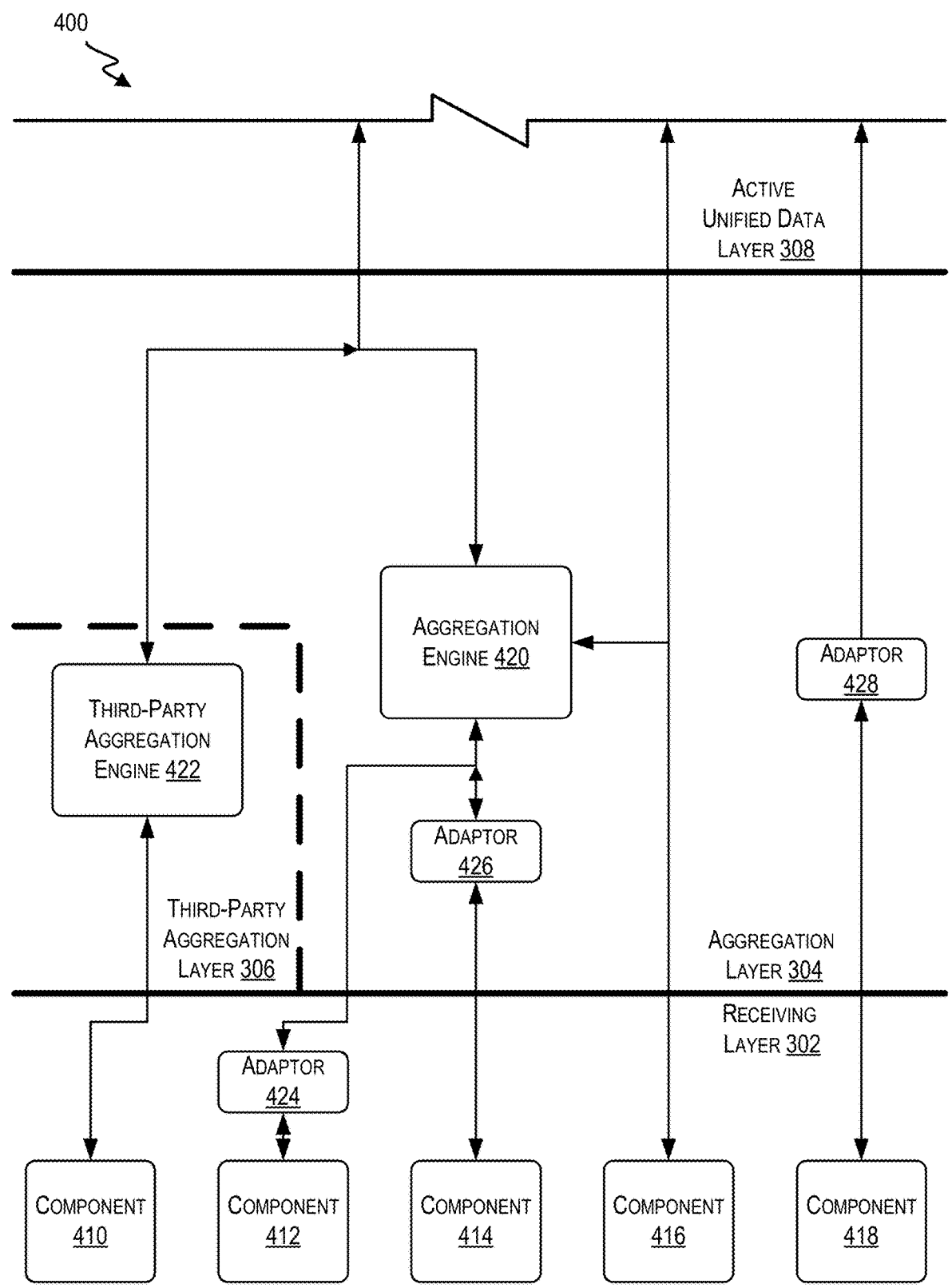
FIG. 4 illustrates a block diagram of a portion of the architecture stack, in accordance with embodiments according to the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
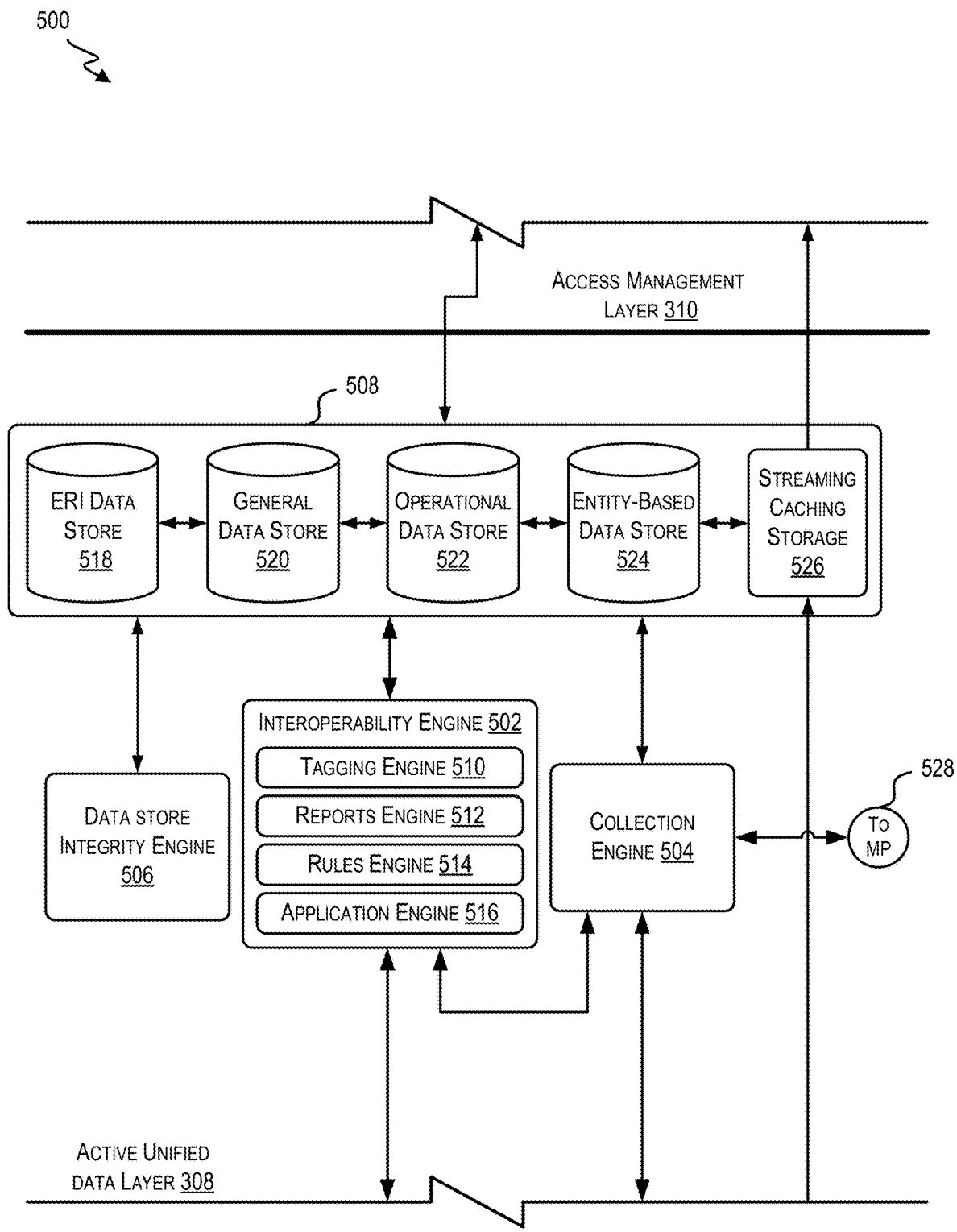
FIG. 5 illustrates a block diagram of a portion of the architecture stack, in accordance with embodiments according to the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used for unique identification of the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
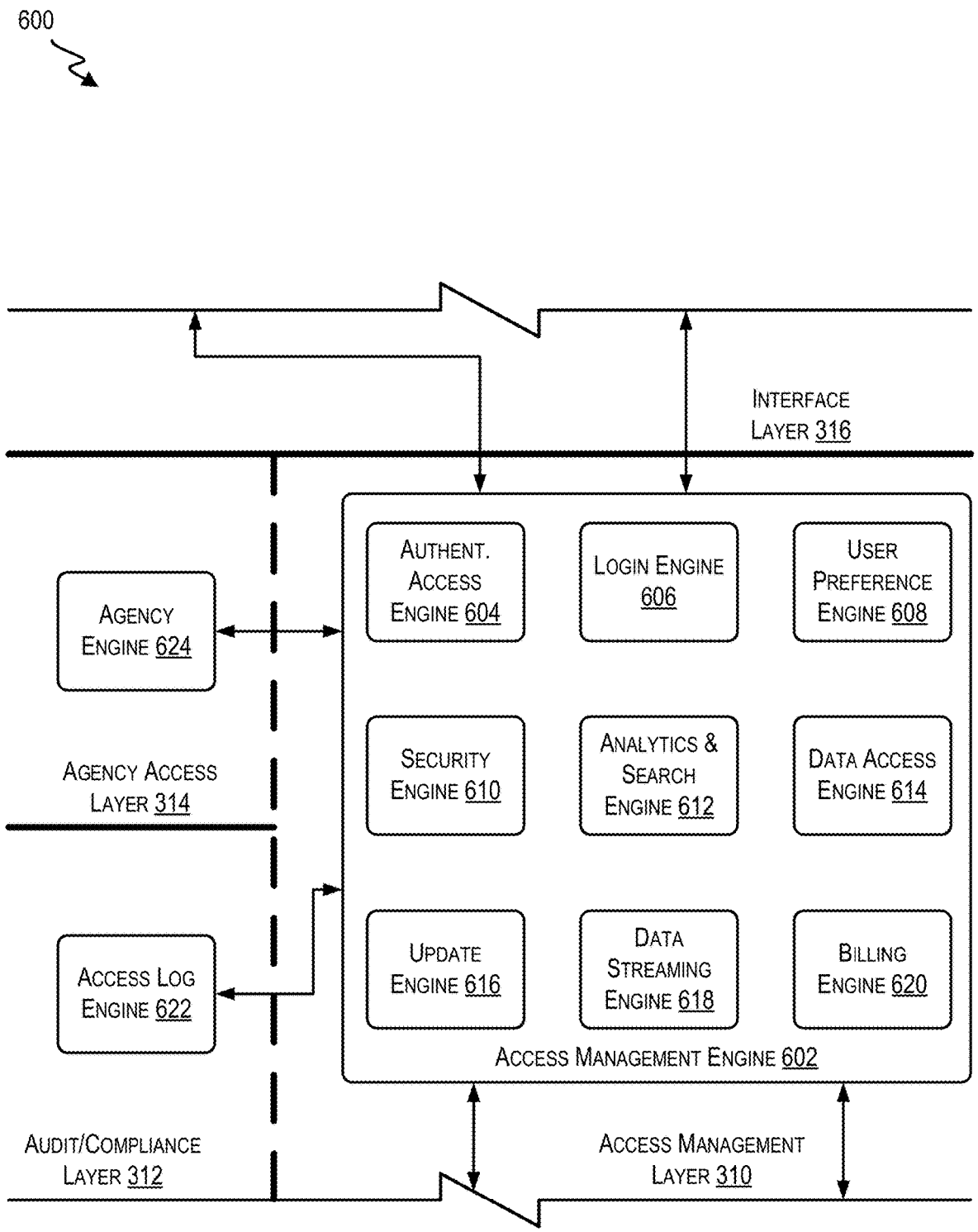
FIG. 6 illustrates a block diagram of a portion of the architecture stack, in accordance with embodiments according to the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

The security engine 610 evaluates the rules and conditions for ensuring the security of access to the elements of the interaction system. In some examples, these rules and conditions are determined by administrators of the interaction system. In some examples, the security engine 610 provides a plurality of computer virus protection services. These services can be called up and implemented when accessing the interaction system or accessing applications associated with the interaction system. For example, because the interaction system may include sensitive data, the security engine 610 may enforce a domain-based rule that protects certain sensitive information (e.g., identifying information).

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
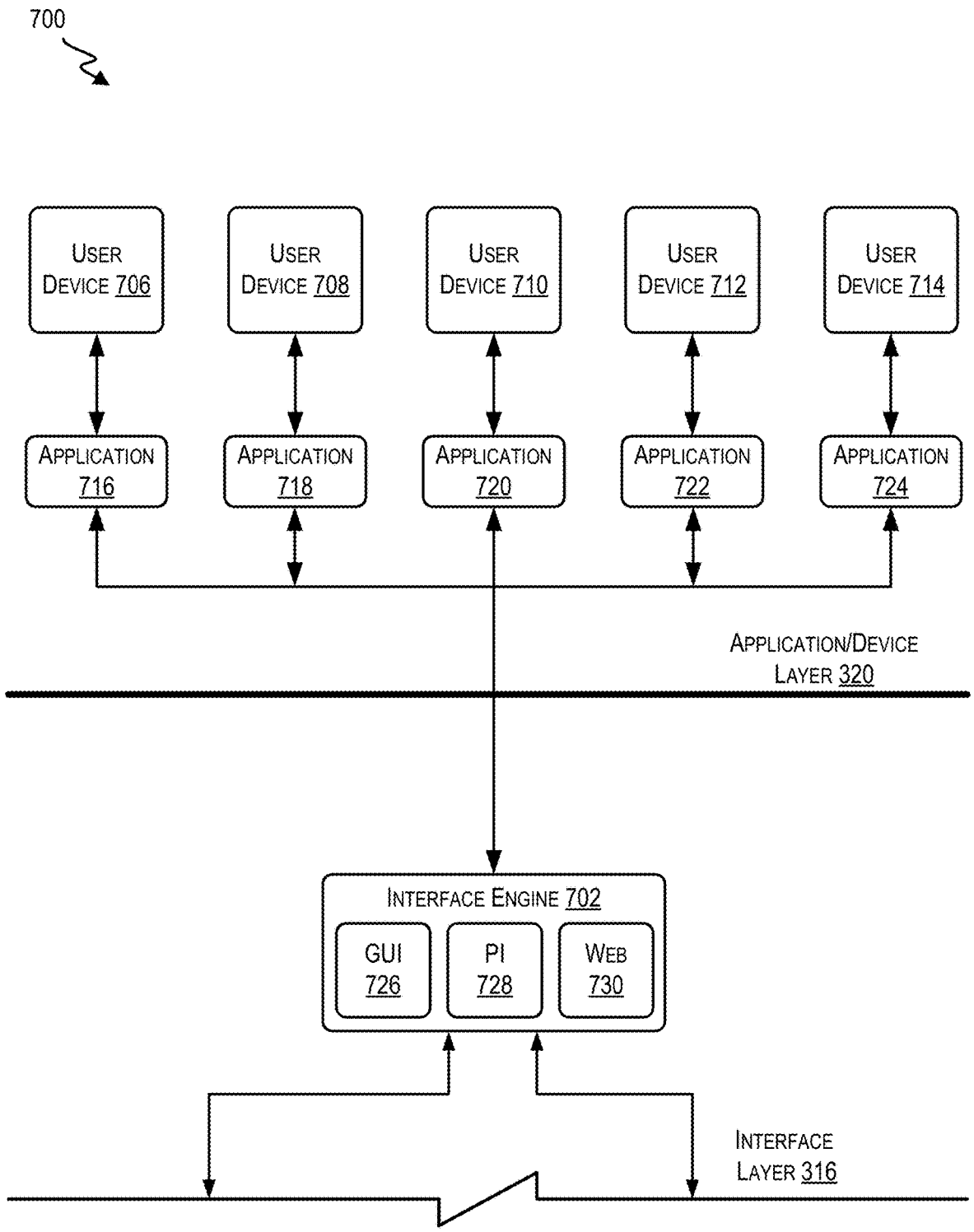
FIG. 7 illustrates a block diagram of a portion of the architecture stack, in accordance with embodiments according to the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are adapted for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or operations, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are adapted to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and predictive modeling. Such operational information may include data because such data may impact operations, programming, predictive modeling, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
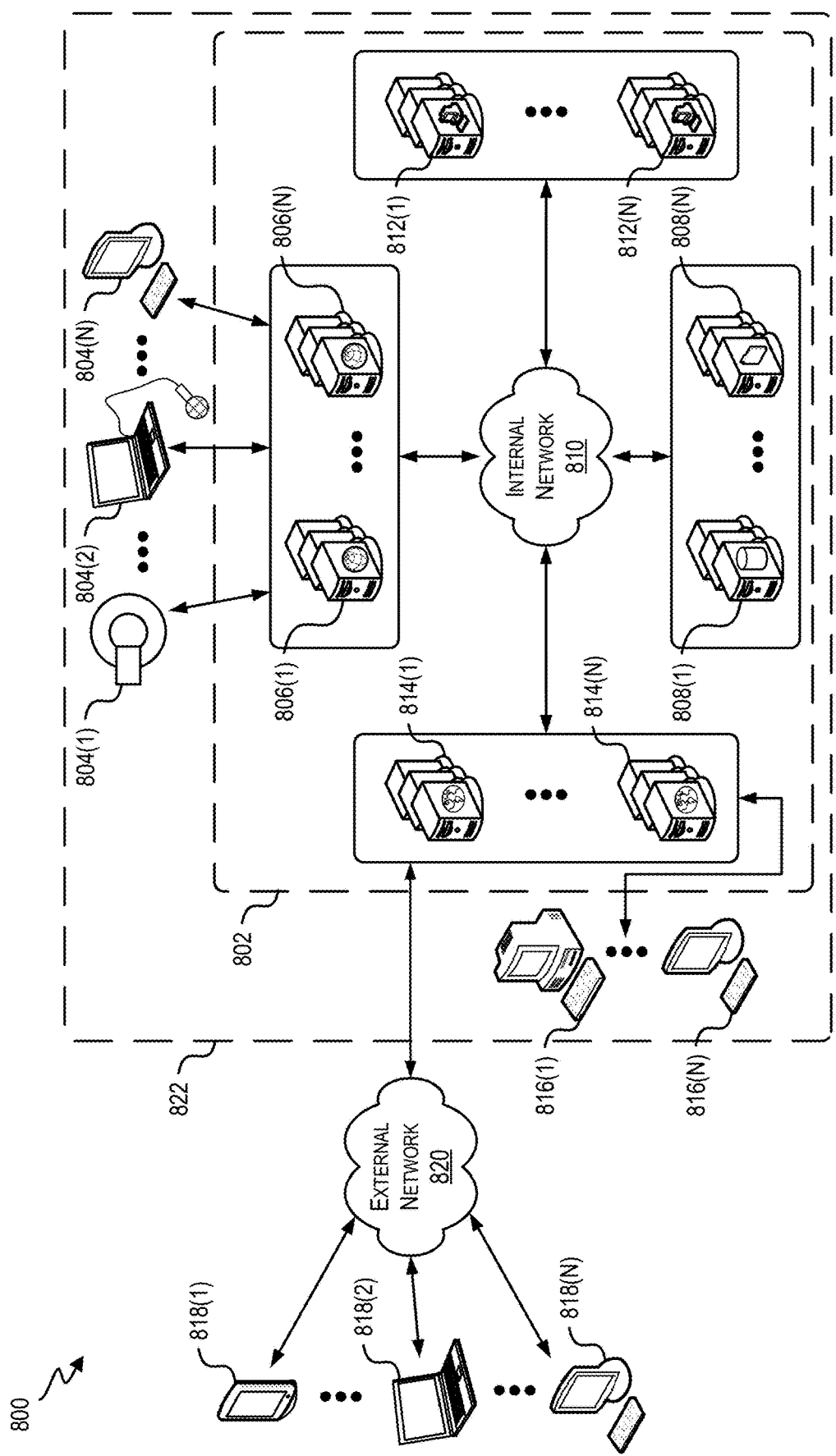
FIG. 8 illustrates an example schematic architecture of the interaction system, in accordance with embodiments according to the present disclosure.

Turning now to FIG. 8, an interaction system 800 is shown in accordance with embodiments of the present disclosure. Interaction system 800 may correspond to interaction systems 100, 200 and may include an internal system 822 including a transformative engine 802. The transformative engine 802 is an example of transformative engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
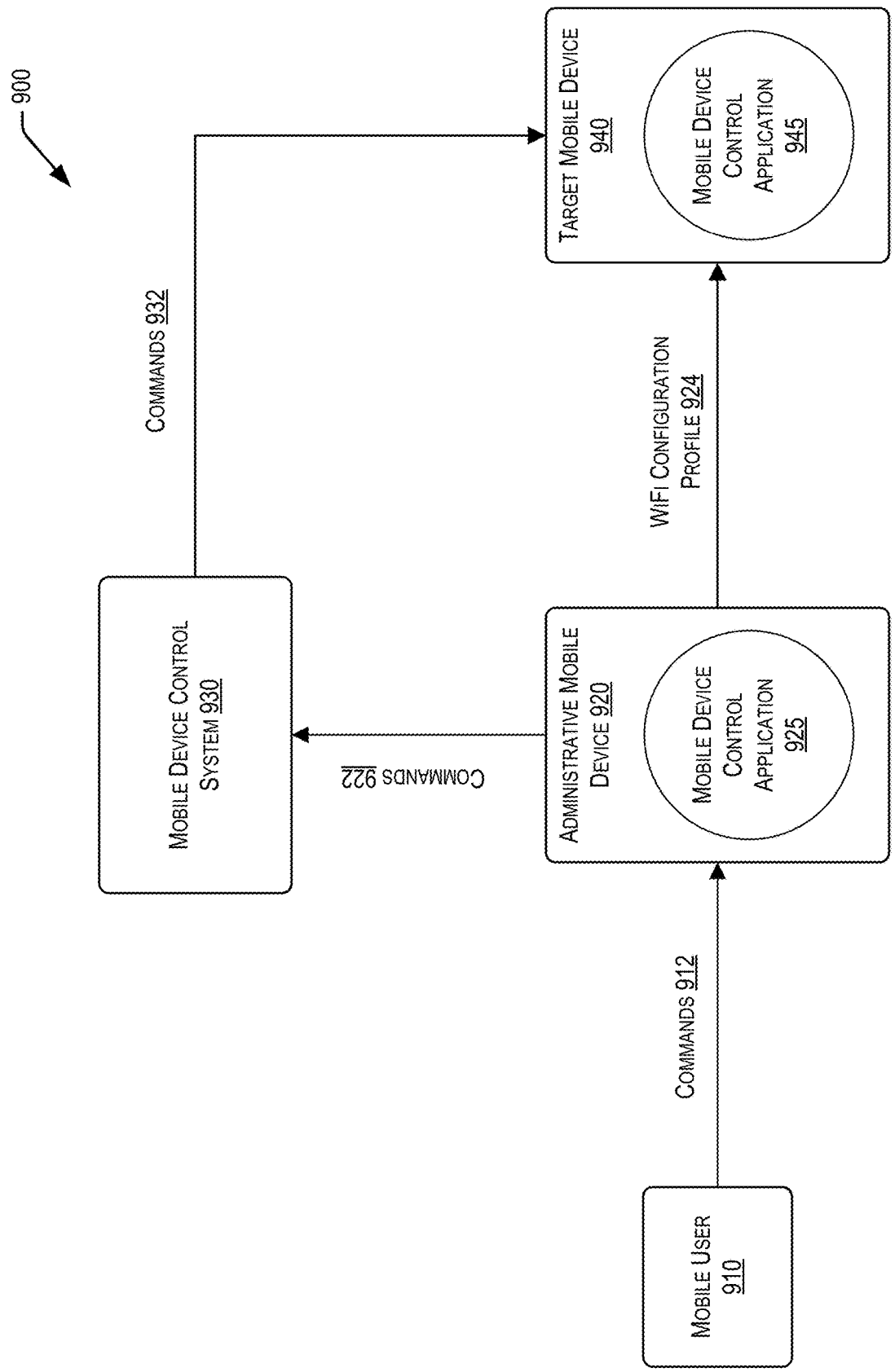
FIG. 9 is an example block diagram illustrating a wireless communication network in which techniques relating to controlling mobile devices may be implemented, in accordance with embodiments according to the present disclosure.

FIG. 9 shows a wireless communication network 900 according to an embodiment of the invention. The wireless communication network 900 includes a mobile user 910, an administrative mobile device 920, a mobile device management (MDM) system 930, and a target mobile device 940. Although only one of each of the mobile user 910, the administrative device 920, and the target mobile device 940 is shown, it is understood that a plurality of mobile users, administrative devices, and target mobile devices may be included. The wireless communication network 900 may be within the internal organization 822 previously discussed, and may be connected via the internal network 810.

The mobile user 910 may be associated with one or more organizations. For example, the mobile user 910 may be a field technician who is responsible for managing the mobile devices within a facility or a department within the facility. The mobile user 910 may have administrative privileges for the mobile devices.

The mobile user 910 may send commands 912 to the administrative mobile device 920. The mobile user 910 may enter the commands 912 via an interface on the display of the administrative mobile device 920. The commands 912 may provide instructions for management of the target mobile device 940.

The administrative mobile device 920 is an example of the internal user devices 816(1)-816(N) previously discussed. The administrative mobile device 920 includes an mobile device control application 925. The mobile device control application 925 may be installed on the administrative mobile device 920 during the initial setup of the administrative mobile device 920 or at a later time. In some examples, in order to use the mobile device control application 925, the administrative mobile device 920 needs to be enrolled by the mobile device control system 930. For example, the mobile device control system 930 may push credentials to the administrative mobile device 920 to install the mobile device control application 925.

The administrative mobile device 920 may send commands 922 to the mobile device control system 930. The commands 922 may provide instructions for the management of the target mobile device 940. The commands 922 may be the same as the commands 912. As discussed in further detail below, the administrative mobile device 920 may also send a WiFi configuration profile 924 to the target mobile device 940. The WiFi configuration profile 924 allows the target mobile device 940 to access a WiFi network that is associated with the wireless communication network 900. The access may be granted temporarily or permanently.

The mobile device control system 930 may include various components, such as servers and/or various computing devices. The mobile device control system 930 may also include data storage systems that include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the other components of the mobile device control system 930. The storage systems may store information about the administrative mobile device 920 and the target mobile device 940.

The mobile device control system 930 may send commands 932 to the target mobile device 940. The commands 932 may provide instructions for the management of the target mobile device 940. The commands 922 may be the same as the commands 912 and/or the commands 922.

The target mobile device 940 is an example of the internal user devices 816(1)-816(N) previously discussed. The target mobile device 940 includes an mobile device control application 945 that is the same as the mobile device control application 925. The mobile device control application 945 may be installed on the target mobile device 940 during the initial setup of the target mobile device 940 or at a later time. In some examples, in order to use the mobile device control application 945, the target mobile device 940 needs to be enrolled by the mobile device control system 930. For example, the mobile device control system 930 may push credentials to the target mobile device 940 to install the mobile device control application 945. In addition, in some examples, the target mobile device 940 must have an API token to scan the QR code, as well as a valid user identifier. The mobile device control system 930 may push the user identifier to the target mobile device 940 during enrollment.

Figure 10:
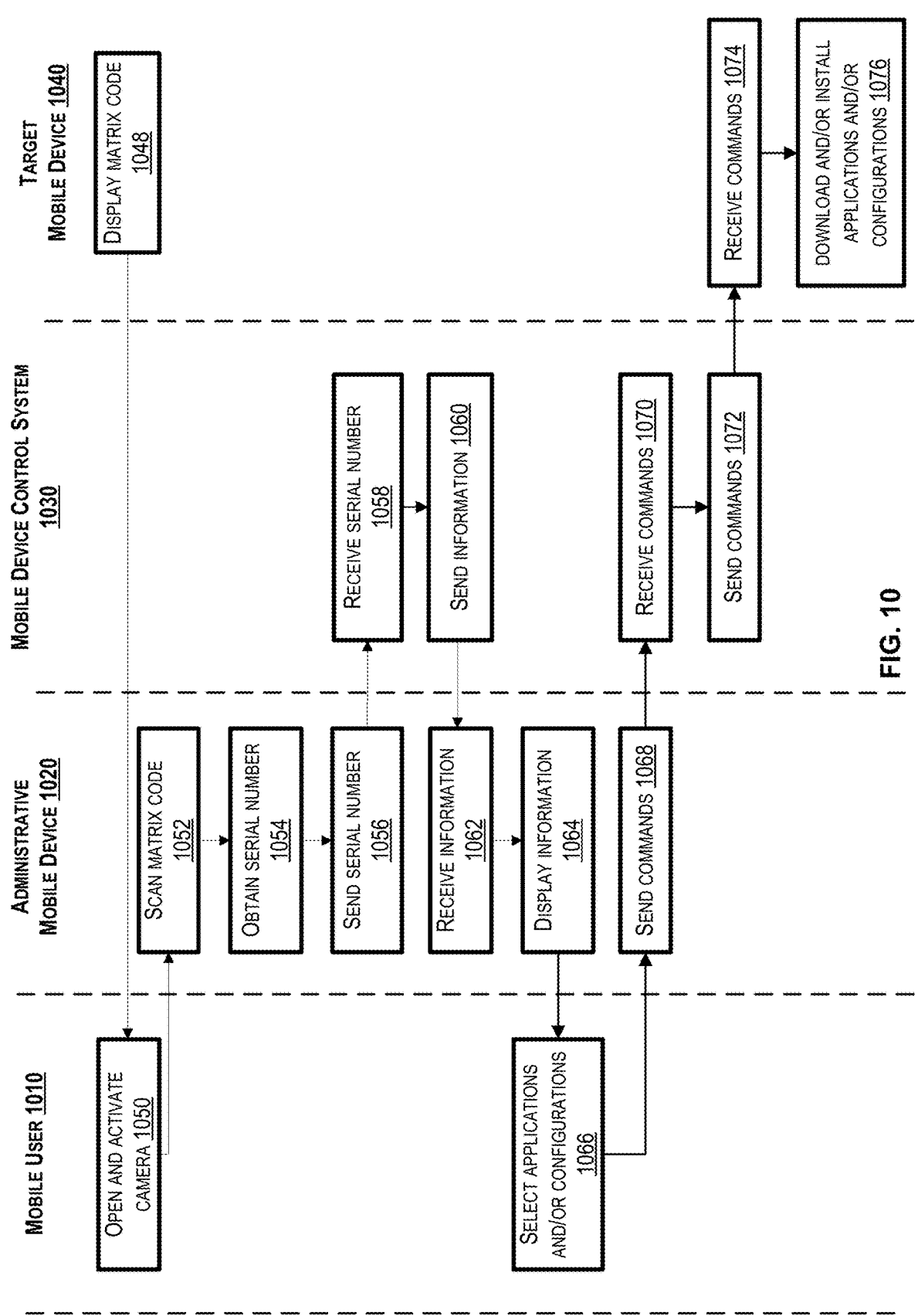
FIG. 10 is an example flowchart illustrating a method of pushing commands to a target mobile device, in accordance with embodiments according to the present disclosure.

FIG. 10 shows a method of pushing commands to a target mobile device according to an embodiment of the invention. The method shown in FIG. 10 allows a field technician to remotely manage a fleet of target mobile devices within a facility or a department within the facility. A target mobile device 1040 may display a matrix code at block 1048. The target mobile device 1040 is an example of the target mobile device 940 previously discussed. The matrix code includes a device identifier identifying the target mobile device 1040. The matrix code may be displayed via an mobile device control application that is installed on the target mobile device 1040.

A mobile user 1010 may open and activate a camera at block 1050. The mobile user 1010 is an example of the mobile user 910 previously discussed. The camera may be a component of an administrative mobile device 1020. The administrative mobile device 1020 is an example of the administrative mobile device 920 previously discussed. The mobile user 1010 may open and activate the camera via an mobile device control application that is installed on the administrative mobile device 1020.

The mobile user 1010 may then use the camera of the administrative mobile device 1020 to scan the matrix code that is displayed on the target mobile device 1040 at block 1052. The administrative mobile device 1020 may obtain the device identifier of the target mobile device 1040 at block 1054. In some examples, the administrative mobile device 1020 may process the scanned image of the matrix code to obtain the device identifier of the target mobile device 1040. In other examples, the administrative mobile device 1020 may display an interface that the mobile user 1010 may use to manually enter the device identifier of the target mobile device 1040.

The administrative mobile device 1020 may then send the device identifier of the target mobile device 1040 to an mobile device control system 1030 at block 1056. The mobile device control system 1030 is an example of the mobile device control system 930 previously discussed. The mobile device control system 1030 may receive the device identifier of the target mobile device 1040 at block 1058. The mobile device control system 1030 may then retrieve information about the target mobile device 1040 from memory, and send the information to the administrative mobile device 1020 at block 1060. The information may include an identifier of the target mobile device 1040, the applications that are installed on the target mobile device 1040, the applications that are available to be installed on the target mobile device 1040, the configurations that are installed on the target mobile device 1040, the configurations that are available to be installed on the target mobile device 1040, etc.

The administrative mobile device 1020 may receive the information about the target mobile device 1040 from the mobile device control system 1030 at block 1062. The administrative mobile device 1020 may then display some or all of the information about the target mobile device 1040 at block 1064. For example, the administrative mobile device 1020 may display a list of the applications that are available to be installed on the target mobile device 1040 and/or a list of the configurations that are available to be installed on the target mobile device 1040.

The mobile user 1010 may then use an interface on the display of the administrative mobile device 1020 to select at least one of the available applications to be installed on the target mobile device 1040 and/or at least one of the available configurations to be installed on the target mobile device 1040 at block 1066. The administrative mobile device 1020 may create at least one command as a function of the selection(s) by the mobile user 1010, and may send the command(s) to the mobile device control system 1030 at block 1068. The command(s) may include instructions for the target mobile device 1040 to download and/or install the selected application(s) and/or the selected configuration(s).

The mobile device control system 1030 may receive the command(s) at block 1070. The mobile device control system 1030 may then process the command(s) and may send the command(s) to the target mobile device 1040 at block 1072. The mobile device control system 1030 may send the same command(s) that were received, or the mobile device control system 1030 may modify and/or reformat the command(s) before sending them to the target mobile device 1040. The mobile device control system 1030 may modify the command(s) in various ways, such as adding instructions that are specific to the target mobile device 1040.

The target mobile device 1040 may receive the command(s) from the mobile device control system 1030 at block 1074. The target mobile device 1040 may follow the instructions within the command(s) to download and/or install the selected application(s) and/or the selected configuration(s) at block 1076. The target mobile device 1040 may download the selected application(s) and/or the selected configuration(s) from the mobile device control system 1030. Accordingly, the mobile user 1010 may update the applications and/or configurations on the target mobile device 1040 remotely, i.e., via the administrative mobile device 1020.

Figure 11:
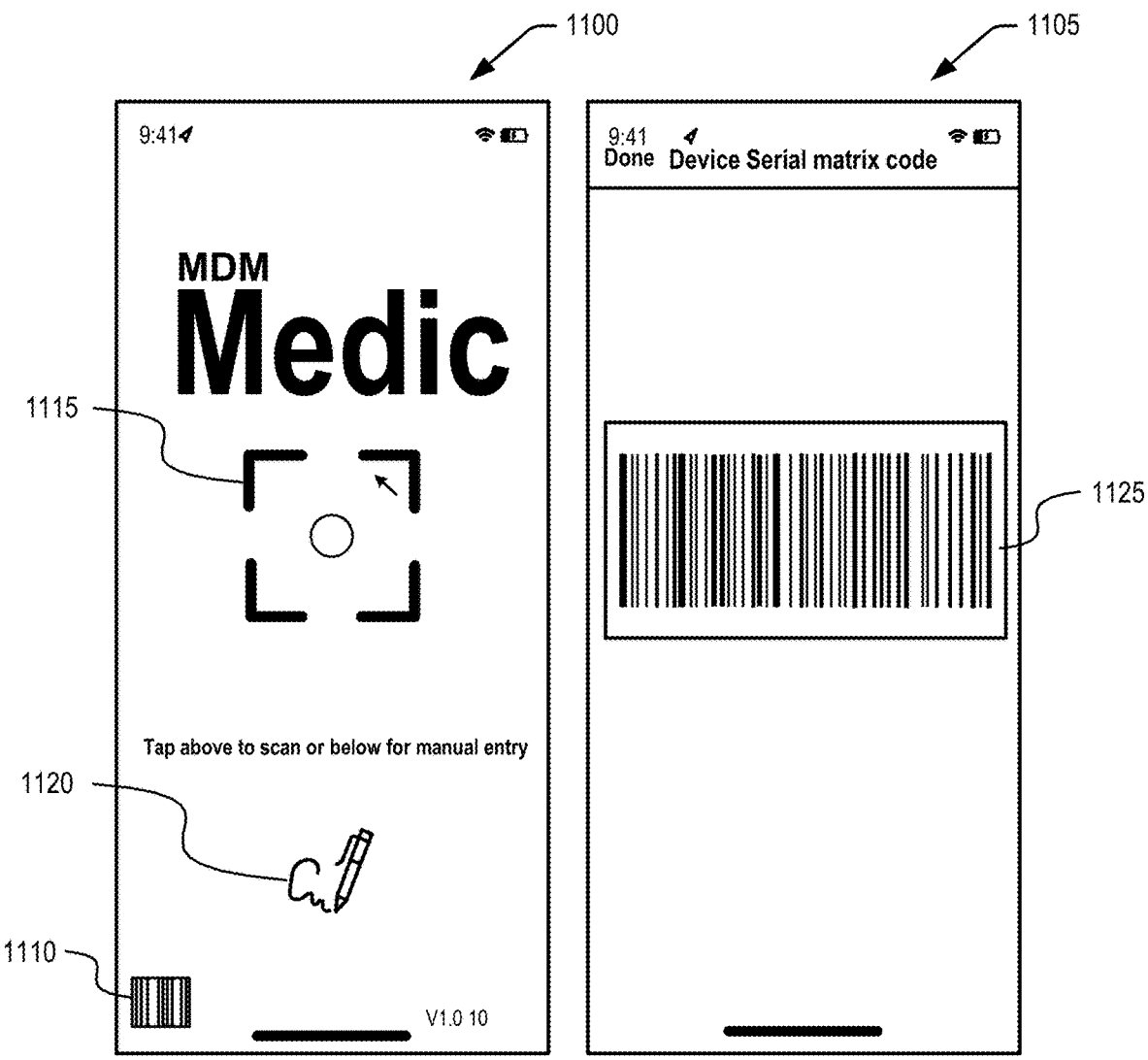
FIG. 11 shows examples of interfaces that may be displayed on an administrative mobile device and/or a target mobile device to enable commands to be pushed from the administrative device to the target mobile device, in accordance with embodiments according to the present disclosure.

FIG. 11 shows examples of interfaces that may be displayed on an administrative mobile device and/or a target mobile device to enable commands to be pushed from the administrative device to the target mobile device according to an embodiment of the invention. The interfaces may be displayed by an mobile device control application that is installed on the administrative mobile device and the target mobile device. Each of the interfaces may be displayed on the administrative device and/or the target mobile device. For example, an interface 1100 that is displayed on an administrative mobile device may include an icon 1115 that opens and activates the camera of the administrative mobile device when a user clicks on the icon 1115. Further, the interface 1100 that is displayed on the administrative mobile device may include an icon 1120 that provides a dialog box for the user to manually enter the device identifier of the target mobile device when the user clicks on the icon 1120.

Further, an interface 1105 that is displayed on the target mobile device may include a matrix code 1125 that includes the device identifier of the target mobile device. The user may display the interface 1105 by clicking on an icon 1110 on the interface 1100 that is displayed on the target mobile device. The user may scan the matrix code 1125 that is displayed on the target mobile device by launching the camera of the administrative device by clicking on the icon 1115 that is displayed on the administrative device.

Figure 12:
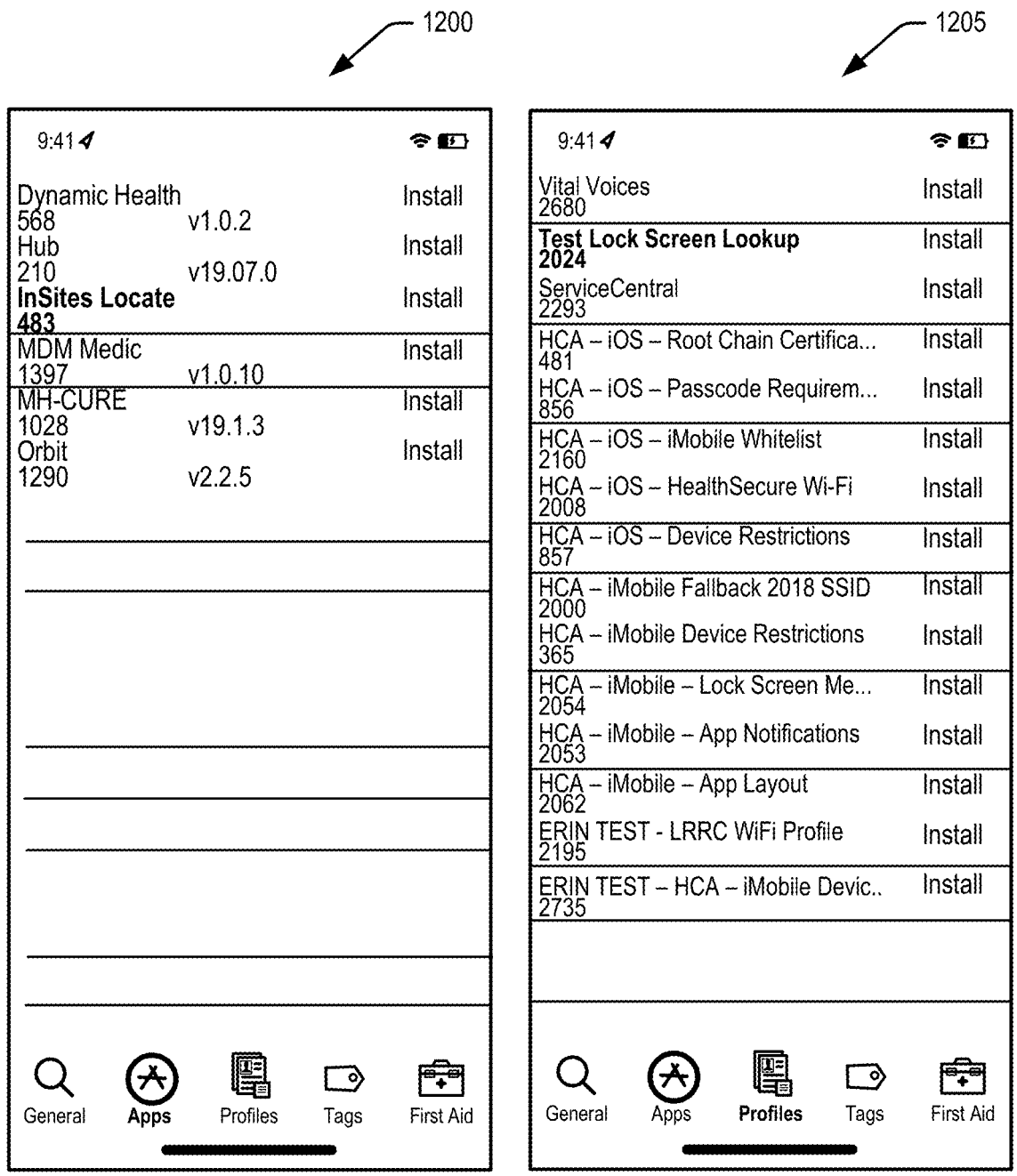
FIG. 12 shows examples of interfaces that may be displayed on an administrative mobile device to show information about a target mobile device, in accordance with embodiments according to the present disclosure.

FIG. 12 shows examples of interfaces that may be displayed on an administrative mobile device to show information about a target mobile device according to an embodiment of the invention. For example, an interface 1200 that is displayed on the administrative mobile device may include a list of applications that are available to be installed on the target mobile device. The user may select an application to be installed on the target mobile device by clicking on the "install" text on the interface 1200 on the administrative mobile device. Similarly, an interface 1205 that is displayed on the administrative mobile device may include a list of configurations that are available to be installed on the target mobile device. The user may select a configuration to be installed on the target mobile device by clicking on the "install" text on the interface 1205 on the administrative mobile device.

Figure 13:
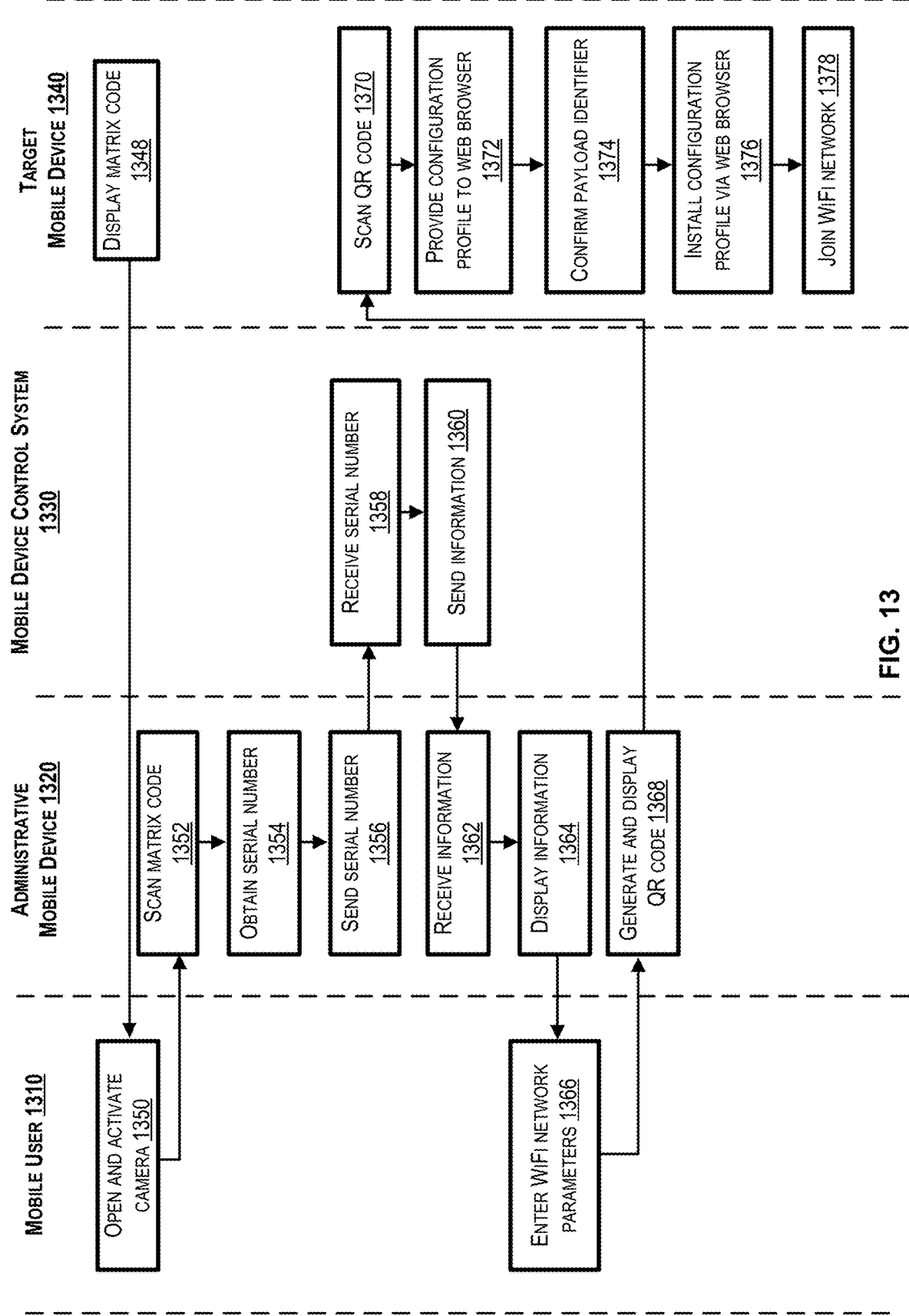
FIG. 13 is an example flowchart illustrating a method of enabling a target mobile device to join a network, according to at least one example, in accordance with embodiments according to the present disclosure.

FIG. 13 shows a method of enabling a target mobile device to join a WiFi network according to an embodiment of the invention. The method shown in FIG. 13 allows a field technician to remotely provide an internet connection to a target mobile device that has lost its internet connection. A target mobile device 1340 may display a matrix code at block 1348. The target mobile device 1340 is an example of the target mobile device 940 previously discussed. The matrix code includes a device identifier identifying the target mobile device 1340. The matrix code may be displayed via an mobile device control application that is installed on the target mobile device 1340.

A mobile user 1310 may open and activate a camera at block 1350. The mobile user 1310 is an example of the mobile user 910 previously discussed. The camera may be a component of an administrative mobile device 1320. The administrative mobile device 1320 is an example of the administrative mobile device 920 previously discussed. The mobile user 1310 may open and activate the camera via an mobile device control application that is installed on the administrative mobile device 1320.

The mobile user 1310 may then use the camera of the administrative mobile device 1320 to scan the matrix code that is displayed on the target mobile device 1340 at block 1352. The administrative mobile device 1320 may obtain the device identifier of the target mobile device 1340 at block 1354. In some examples, the administrative mobile device 1320 may process the scanned image of the matrix code to obtain the device identifier of the target mobile device 1340. In other examples, the administrative mobile device 1320 may display an interface that the mobile user 1310 may use to manually enter the device identifier of the target mobile device 1340.

The administrative mobile device 1320 may then send the device identifier of the target mobile device 1340 to an mobile device control system 1330 at block 1356. The mobile device control system 1330 is an example of the mobile device control system 930 previously discussed. The mobile device control system 1330 may receive the device identifier of the target mobile device 1340 at block 1358. The mobile device control system 1330 may then retrieve information about the target mobile device 1340 from memory, and send the information to the administrative mobile device 1320 at block 1360. The information may include an identifier of the target mobile device 1340, a security level of the target mobile device 1340, a model of the target mobile device 1340, etc.

The administrative mobile device 1320 may receive the information about the target mobile device 1340 from the mobile device control system 1330 at block 1362. The administrative mobile device 1320 may then display some or all of the information about the target mobile device 1340 at block 1364. For example, the administrative mobile device 1320 may display the identifier of the target mobile device 1340 on the administrative device 1320.

The mobile user 1310 may then use an interface on the display of the administrative mobile device 1320 to enter at least one WiFi network parameter of a WiFi network for the target mobile device 1340 to join at block 1366. For example, the mobile user 1310 may enter a service set identifier (SSID) and/or a pre-shared key (PSK) of the WiFi network. The WiFi network may be a public network or a private network.

The administrative mobile device 1320 may then generate and display a QR code as a function of the WiFi network parameter(s) at block 1368. The QR code is dynamically generated, and a different QR code is generated for each WiFi network. The QR code includes a custom configuration profile for the target mobile device 1340 to join the WiFi network. For example, the custom configuration profile may be an Apple® configuration profile for the WiFi network for iOS devices.

The target mobile device 1340 may then scan the QR code that is displayed on the administrative mobile device 1320 at block 1370. For example, the mobile user 1310 may use the camera of the target mobile device 1340 to take a picture of the QR code that is displayed on the administrative mobile device 1320. After scanning the QR code at block 1370, the mobile device control application on the target mobile device 1340 operates as a local web server and provides the configuration profile from the QR code to a web browser on the target mobile device 1340 at block 1372. For example, the web browser may be Safari or another iOS-compatible web browser. The local web server may pull in data from the QR code, convert the data to a string, store the string as a file, and point the web browser to the file. This method allows the target mobile device 1340 to circumvent restrictions on the WiFi networks that it is allowed to join.

As a security measure, the mobile device control application on the target mobile device 1340 may determine whether the QR code includes a payload identifier. If the mobile device control application determines that the QR code does not include the payload identifier, the configuration profile may not be installed. On the other hand, if the mobile device control application determines that the QR code includes the payload identifier at block 1374, the web browser may install the configuration profile on the target mobile device 1340 at block 1376. Once the configuration profile has been installed on the target mobile device 1340, the target mobile device 1340 may join the WiFi network at block 1378. The QR code may include a duration of time, such as an hour, after which the target mobile device 1340 is disconnected from the WiFi network associated with the QR code and returns to its home network. Accordingly, the QR code may be used to temporarily establish the target mobile device 1340 on a WiFi network after the target mobile device 1340 loses its connection to its home network.

Figure 14:
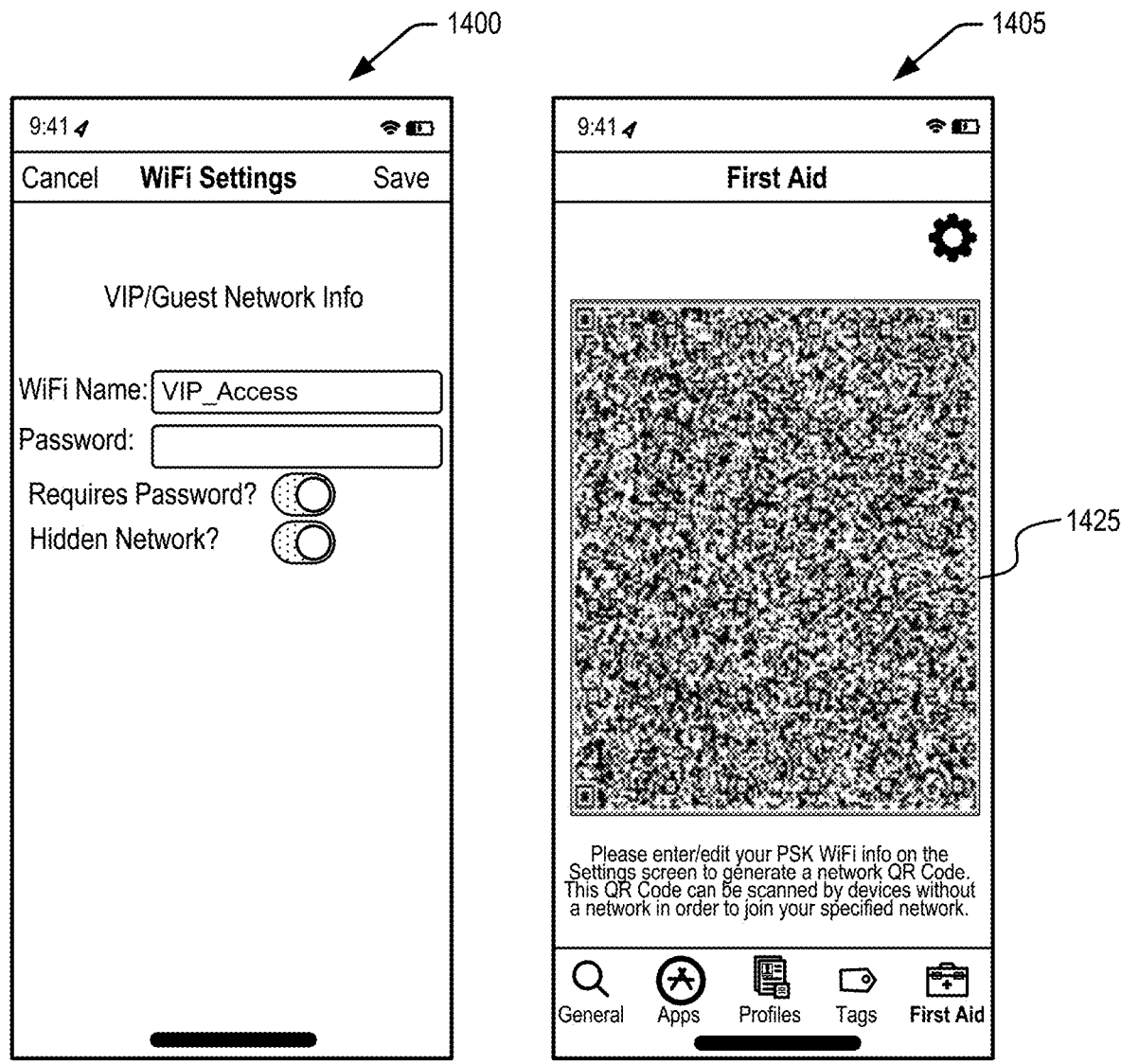
FIG. 14 shows examples of interfaces that may be displayed on an administrative mobile device to enable a target mobile device to join a network, in accordance with embodiments according to the present disclosure.

FIG. 14 shows examples of interfaces that may be displayed on an administrative mobile device to enable a target mobile device to join a WiFi network according to an embodiment of the invention. For example, an interface 1400 that is displayed on the administrative mobile device may include dialog boxes for a user to enter at least one network parameter, such as an SSID of the WiFi network (shown as WiFi Name) and/or a PSK of the WiFi network (shown as Password). The interface 1400 may also include toggle switches that the user can select to indicate whether a password is required and whether the WiFi network is hidden.

Once the network parameter(s) have been entered, an interface 1405 that includes a QR code 1425 generated by an mobile device control application on the administrative mobile device may be displayed. A target mobile device may scan the QR code 1425 in order to join the corresponding WiFi network, as discussed above. The same QR code 1425 may be used to allow different target mobile devices to join the WiFi network, or the QR code 1425 may be specific to a particular target mobile device.

Figure 15:
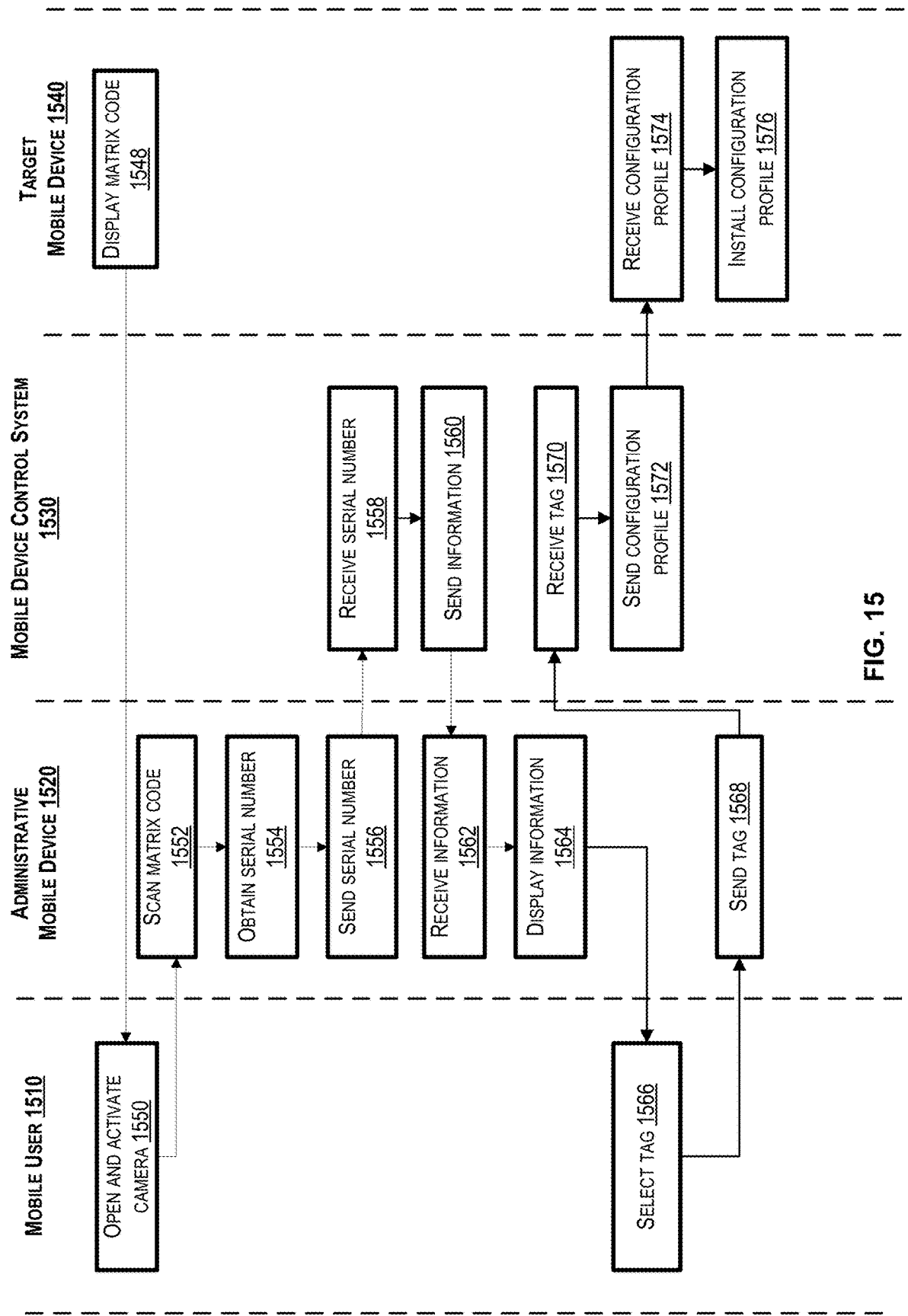
FIG. 15 is an example flowchart illustrating a method of adding or changing a tag of a target mobile device, according to at least one example, in accordance with embodiments according to the present disclosure.

FIG. 15 shows a method of adding or changing a tag of a target mobile device according to an embodiment of the invention. The method shown in FIG. 15 allows a field technician to remotely reassign or transfer the target mobile device to another facility or another department within the facility. A target mobile device 1540 may display a matrix code at block 1548. The target mobile device 1540 is an example of the target mobile device 940 previously discussed. The matrix code includes a device identifier identifying the target mobile device 1540. The matrix code may be displayed via an mobile device control application that is installed on the target mobile device 1540.

A mobile user 1510 may open and activate a camera at block 1550. The mobile user 1510 is an example of the mobile user 910 previously discussed. The camera may be a component of an administrative mobile device 1520. The administrative mobile device 1520 is an example of the administrative mobile device 920 previously discussed. The mobile user 1510 may open and activate the camera via an mobile device control application that is installed on the administrative mobile device 1520.

The mobile user 1510 may then use the camera of the administrative mobile device 1520 to scan the matrix code that is displayed on the target mobile device 1540 at block 1552. The administrative mobile device 1520 may obtain the device identifier of the target mobile device 1540 at block 1554. In some examples, the administrative mobile device 1520 may process the scanned image of the matrix code to obtain the device identifier of the target mobile device 1540. In other examples, the administrative mobile device 1520 may display an interface that the mobile user 1510 may use to manually enter the device identifier of the target mobile device 1540.

The administrative mobile device 1520 may then send the device identifier of the target mobile device 1540 to an mobile device control system 1530 at block 1556. The mobile device control system 1530 is an example of the mobile device control system 930 previously discussed. The mobile device control system 1530 may receive the device identifier of the target mobile device 1540 at block 1558. The mobile device control system 1530 may then retrieve information about the target mobile device 1540 from memory, and send the information to the administrative mobile device 1520 at block 1560. The information may include an identifier of the target mobile device 1540, whether the target mobile device 1540 is tagged, a list of possible tags for the target mobile device 1540, etc.

The administrative mobile device 1520 may receive the information about the target mobile device 1540 from the mobile device control system 1530 at block 1562. The administrative mobile device 1520 may then display some or all of the information about the target mobile device 1540 at block 1564. For example, the administrative mobile device 1520 may display a first tag that is assigned to the target mobile device 1540 and/or a list of second tags that are available to be assigned to the target mobile device 1540. The tags may indicate an entity to which the target mobile device 1540 is assigned. For example, the entity may be a facility, a department within the facility, or a field technician who is responsible for managing mobile devices.

The mobile user 1510 may then use an interface on the display of the administrative mobile device 1520 to select one of the available tags to be assigned to the target mobile device 1540 at block 1566. The administrative mobile device 1520 may send the selected tag to the mobile device control system 1530 at block 1568.

The mobile device control system 1530 may receive the selected tag at block 1570. The mobile device control system 1530 may then process the selected tag and identify a configuration profile corresponding to the selected tag from memory. The configuration profile may meet the requirements of the entity that is identified by the selected tag. The mobile device control system 1530 may then send the configuration profile to the target mobile device at block 1572.

The target mobile device 1540 may receive the configuration profile from the mobile device control system 1530 at block 1574. The target mobile device 1540 may then install the configuration profile at block 1576. Accordingly, the mobile user 1510 may remotely update the tag and/or the configuration profile on the target mobile device 1540, i.e., via the administrative mobile device 1520. Further, the mobile user 1510 may remotely reassign or transfer the target mobile device 1540 to another entity.

Figure 16:
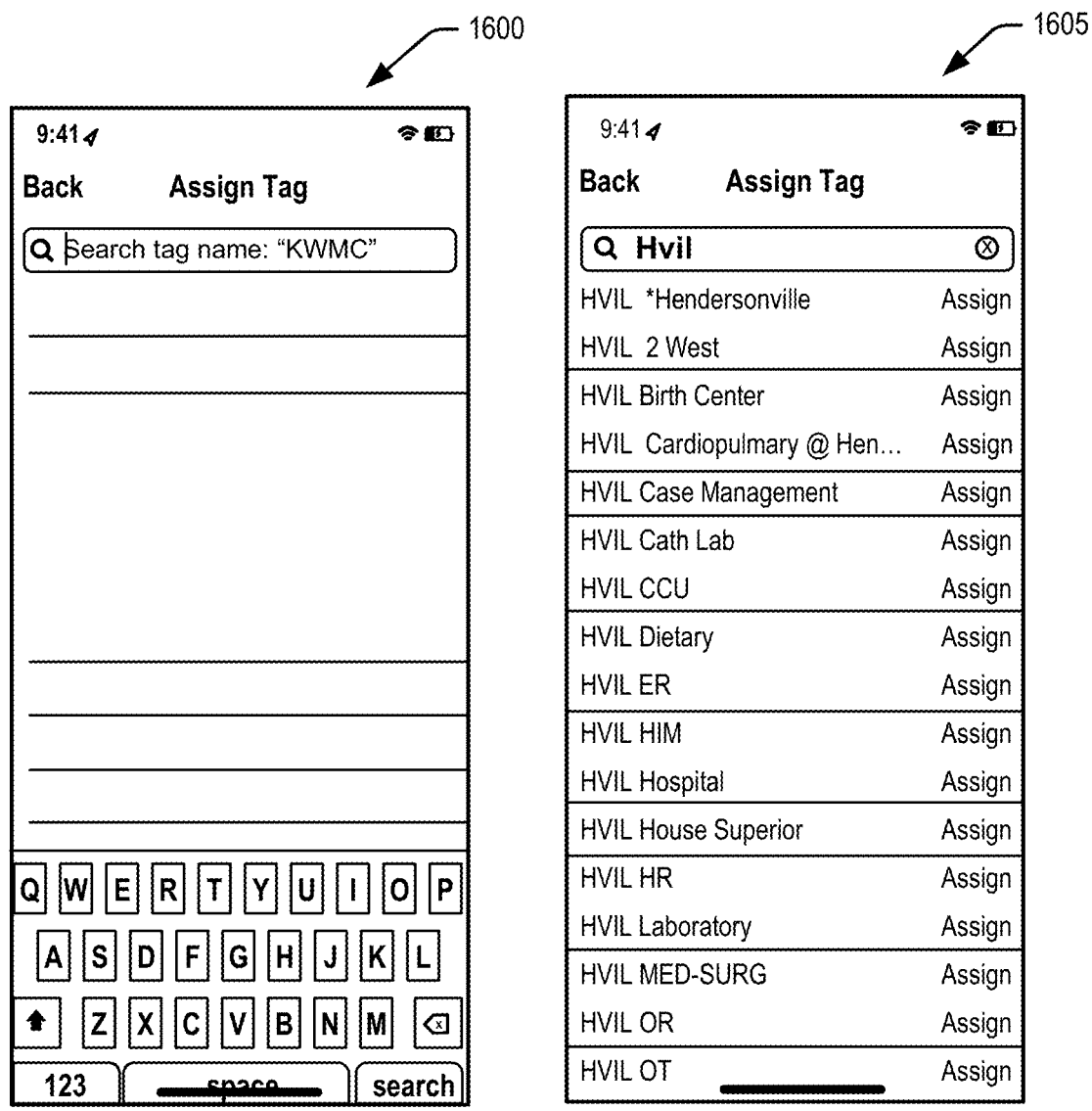
FIG. 16 shows examples of interfaces that may be displayed on an administrative mobile device to enable a user to add or change a tag of a target mobile device, in accordance with embodiments according to the present disclosure.

FIG. 16 shows examples of interfaces that may be displayed on an administrative mobile device to enable a user to add or change a tag of a target mobile device according to an embodiment of the invention. For example, an interface 1600 that is displayed on the administrative mobile device may include a dialog box for a user to search for a tag to be assigned to the target mobile device. An interface 1605 may display a list of matching tags that may be assigned to the target mobile device. The user may select a tag to be assigned to the target mobile device by clicking on the corresponding "assign" text on the interface 1605 on the administrative mobile device.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. A system to facilitate adaptive operational control of a mobile device, the system comprising:
one or more processing devices; and
memory communicatively coupled with and readable by the one or more processing devices and having stored therein processor-readable instructions which, when executed by the one or more processing devices, cause the one or more processing devices to perform operations comprising:
detecting one or more operational metrics of a mobile device;
accessing operational specifications with operating parameters specified for the mobile device;
comparing the operating parameters to the one or more operational metrics;
determining that the one or more operational metrics correspond to an operational degradation condition of the mobile device based at least in part on the comparing the operating parameters to the one or more operational metrics;
determining a device identifier corresponding to the mobile device;
consequent to the determining that the one or more operational metrics correspond to an operational degradation condition of the mobile device:
accessing device specifications that are identified as a function of the device identifier;
using the device specifications identified as a function of the device identifier to identify one or more applications and/or configuration data that are specified for the mobile device and mapping the one or more applications and/or the configuration data to the operational degradation condition of the mobile device;
causing transmission of the one or more applications and/or the configuration data to the mobile device;
where, consequent to the transmission, the mobile device is configured with the one or more applications and/or the configuration data.

2. The system to facilitate adaptive operational control of a mobile device as recited in claim 1, the operations further comprising:
causing configuring of the mobile device with the one or more applications and/or the configuration data.

3. The system to facilitate adaptive operational control of a mobile device as recited in claim 2, the operations further comprising:
causing the mobile device to uninstall at least one installed application and/or to delete configuration data previously stored by the mobile device.

4. The system to facilitate adaptive operational control of a mobile device as recited in claim 3, where the determining the device identifier corresponding to the mobile device is based at least in part on a matrix code generated by the mobile device.

5. The system to facilitate adaptive operational control of a mobile device as recited in claim 4, where at least one of the one or more operational metrics, the operational degradation condition, and/or the operating parameters are determined based at least in part on a matrix code.

6. The system to facilitate adaptive operational control of a mobile device as recited in claim 5, the operations further comprising:
downloading the one or more applications and/or the configuration data from a remote system or instantiating the one or more applications and/or the configuration data from previously stored instance of the one or more applications and/or the configuration data on a second mobile device.

7. The system to facilitate adaptive operational control of a mobile device as recited in claim 6, where the operations are performed by the second mobile device.

8. One or more non-transitory, machine-readable media having machine-readable instructions thereon which, when executed by one or more processing devices, cause the one or more processing devices to perform operations comprising:
detecting one or more operational metrics of a mobile device;
accessing operational specifications with operating parameters specified for the mobile device;
comparing the operating parameters to the one or more operational metrics;
determining that the one or more operational metrics correspond to an operational degradation condition of the mobile device based at least in part on the comparing the operating parameters to the one or more operational metrics;
determining a device identifier corresponding to the mobile device;
consequent to the determining that the one or more operational metrics correspond to an operational degradation condition of the mobile device:
accessing device specifications that are identified as a function of the device identifier;
using the device specifications identified as a function of the device identifier to identify one or more applications and/or configuration data that are specified for the mobile device and mapping the one or more applications and/or the configuration data to the operational degradation condition of the mobile device;
causing transmission of the one or more applications and/or the configuration data to the mobile device;
where, consequent to the transmission, the mobile device is configured with the one or more applications and/or the configuration data.

9. The one or more non-transitory, machine-readable media as recited in claim 8, the operations further comprising:
causing configuring of the mobile device with the one or more applications and/or the configuration data.

10. The one or more non-transitory, machine-readable media as recited in claim 9, the operations further comprising
causing the mobile device to uninstall at least one installed application and/or to delete configuration data previously stored by the mobile device.

11. The one or more non-transitory, machine-readable media as recited in claim 10, where the determining the device identifier corresponding to the mobile device is based at least in part on a matrix code generated by the mobile device.

12. The one or more non-transitory, machine-readable media as recited in claim 11, where at least one of the one or more operational metrics, the operational degradation condition, and/or the operating parameters are determined based at least in part on a matrix code.

13. The one or more non-transitory, machine-readable media as recited in claim 12, the operations further comprising:
downloading the one or more applications and/or the configuration data from a remote system or instantiating the one or more applications and/or the configuration data from previously stored instance of the one or more applications and/or the configuration data on a second mobile device.

14. The one or more non-transitory, machine-readable media as recited in claim 13, where the operations are performed by the second mobile device.

15. A method to facilitate adaptive operational control of a mobile device, the method comprising:
  detecting one or more operational metrics of a mobile device;
  accessing operational specifications with operating parameters specified for the mobile device;
  comparing the operating parameters to the one or more operational metrics;
  determining that the one or more operational metrics correspond to an operational degradation condition of the mobile device based at least in part on the comparing the operating parameters to the one or more operational metrics;
  determining a device identifier corresponding to the mobile device;
  consequent to the determining that the one or more operational metrics correspond to an operational degradation condition of the mobile device:
    accessing device specifications that are identified as a function of the device identifier;
    using the device specifications identified as a function of the device identifier to identify one or more applications and/or configuration data that are specified for the mobile device and mapping the one or more applications and/or the configuration data to the operational degradation condition of the mobile device;
    causing transmission of the one or more applications and/or the configuration data to the mobile device;
    where, consequent to the transmission, the mobile device is configured with the one or more applications and/or the configuration data.

16. The method to facilitate adaptive operational control of a mobile device as recited in claim 15, the method further comprising:
  causing configuring of the mobile device with the one or more applications and/or the configuration data.

17. The method to facilitate adaptive operational control of a mobile device as recited in claim 16, the method further comprising:
  causing the mobile device to uninstall at least one installed application and/or to delete configuration data previously stored by the mobile device.

18. The method to facilitate adaptive operational control of a mobile device as recited in claim 17, where the determining the device identifier corresponding to the mobile device is based at least in part on a matrix code generated by the mobile device.

19. The method to facilitate adaptive operational control of a mobile device as recited in claim 18, where at least one of the one or more operational metrics, the operational degradation condition, and/or the operating parameters are determined based at least in part on a matrix code.

20. The method to facilitate adaptive operational control of a mobile device as recited in claim 19, the method further comprising:
  downloading the one or more applications and/or the configuration data from a remote system or instantiating the one or more applications and/or the configuration data from previously stored instance of the one or more applications and/or the configuration data on a second mobile device.

* * * * *